US011949780B2

(12) United States Patent
Afanasyeva et al.

(10) Patent No.: US 11,949,780 B2
(45) Date of Patent: Apr. 2, 2024

(54) TECHNOLOGIES FOR MULTIPLE DEVICE AUTHENTICATION IN A HETEROGENEOUS NETWORK

(71) Applicant: Intel Corporation, Santa Clara, CA (US)

(72) Inventors: Alexandra Afanasyeva, Saint Petersburg (RU); Sergey Bezzateev, Saint Petersburg (RU); Vitaly Petrov, Saint Petersburg (RU); Konstantin Zhidanov, Saint Petersburg (RU); Natalia Voloshina, Saint Petersburg (RU); Vladimir Zybin, Novgorod (RU); Anna Bakunova, Moscow (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/868,526

(22) Filed: Jul. 19, 2022

(65) Prior Publication Data

US 2022/0360432 A1   Nov. 10, 2022

Related U.S. Application Data

(63) Continuation of application No. 16/328,497, filed as application No. PCT/IB2016/001520 on Sep. 30, 2016, now Pat. No. 11,438,147.

(51) Int. Cl.
*H04L 9/08* (2006.01)
*H04L 9/32* (2006.01)

(52) U.S. Cl.
CPC ............ *H04L 9/085* (2013.01); *H04L 9/0844* (2013.01); *H04L 9/0897* (2013.01); *H04L 9/3252* (2013.01)

(58) Field of Classification Search
CPC ..... H04L 63/08; H04L 63/0428; H04L 67/28; H04L 2012/2841; H04L 2463/101;
(Continued)

(56) References Cited

U.S. PATENT DOCUMENTS 5,937,066 A * 8/1999 Gennaro ................. H04L 9/085
380/286
6,055,508 A * 4/2000 Naor ....................... H04L 43/00
713/168
(Continued)

FOREIGN PATENT DOCUMENTS

CN        102257504 A      11/2011
CN        103119975 A      5/2013
(Continued)

OTHER PUBLICATIONS

International Searching Authority, "Search Report and Written Opinion," issued in connection with International Patent Application No. PCT/IB2016/001520, dated Jun. 27, 2017, 10 pages.
(Continued)

*Primary Examiner* — Sharif E Ullah
(74) *Attorney, Agent, or Firm* — Hanley, Flight & Zimmerman, LLC

(57) ABSTRACT

A disclosed example gateway node includes network communicator circuitry, memory, instructions, and processor circuitry. The network communicator circuitry is to send a first portion of a multi-part secret key to a first secret holder node, and send a plurality of shares of a second portion of the multi-part secret key to second secret holder nodes. The processor circuitry is to execute the instructions to combine responses from the first secret holder node and at least one of the second secret holder nodes to generate a combined
(Continued)

authentication message, the network communicator circuitry to send the combined authentication message to a terminal node for authentication.

22 Claims, 10 Drawing Sheets

(58) Field of Classification Search
CPC ..... H04L 47/10; H04L 63/0869; H04L 63/10; H04L 69/12; H04L 45/00; H04L 51/38; H04L 63/0272; H04L 9/085; H04L 9/0844; H04L 9/0897; H04W 12/069; H04W 88/16; H04W 4/12; H04W 84/18; H04W 12/06; H04W 80/04; H04W 28/0289; H04W 28/08; H04W 36/245; H04W 4/02; H04W 4/029; H04W 84/12; H04W 28/24; H04W 36/18; H04W 48/06; H04W 64/00; H04W 72/0453; H04W 76/10; G06F 21/10; G06F 2221/0706; G06F 21/44; H04N 2005/91328; H04N 2005/91364; H04N 21/2347; H04N 21/23473; H04N 21/2541; H04N 21/4181; H04N 21/426; H04N 21/43615; H04N 21/4367
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 6,687,823 | B1* | 2/2004 | Al-Salqan | G06F 21/40 713/168 |
| 7,200,752 | B2* | 4/2007 | Eskicioglu | H04N 7/163 713/180 |
| 7,383,570 | B2* | 6/2008 | Pinkas | H04L 63/12 726/19 |
| 7,448,077 | B2* | 11/2008 | Curran | H04L 63/10 726/27 |
| 8,239,928 | B2* | 8/2012 | Huang | H04L 9/3226 713/153 |
| 8,639,929 | B2* | 1/2014 | Bian | H04L 9/321 713/168 |
| 8,688,940 | B2* | 4/2014 | Sprouse | G06F 21/79 711/163 |
| 8,955,065 | B2* | 2/2015 | Hitchcock | H04L 63/083 726/5 |
| 9,037,864 | B1* | 5/2015 | Staddon | G06F 21/31 713/182 |
| 9,348,981 | B1* | 5/2016 | Hearn | H04L 9/3271 |
| 10,061,914 | B2* | 8/2018 | Proulx | H04L 9/0863 |
| 10,944,776 | B2* | 3/2021 | Bharrat | G06Q 10/06393 |
| 11,283,623 | B1* | 3/2022 | Griffin | H04L 9/3268 |
| 11,438,147 | B2* | 9/2022 | Afanasyeva | H04L 9/0897 |
| 2010/0031019 | A1* | 2/2010 | Manning | H04L 63/30 713/153 |
| 2010/0250955 | A1* | 9/2010 | Trevithick | G06F 21/31 713/185 |
| 2010/0293600 | A1* | 11/2010 | Schechter | H04L 63/083 726/4 |
| 2012/0174203 | A1* | 7/2012 | Frank | G06F 21/31 726/7 |
| 2013/0042311 | A1* | 2/2013 | Broder | G06F 21/31 726/7 |
| 2013/0097697 | A1* | 4/2013 | Zhu | H04L 63/083 726/18 |
| 2013/0276125 | A1* | 10/2013 | Bailey | G06F 21/46 726/25 |
| 2014/0053251 | A1* | 2/2014 | Chen | G06F 21/33 726/6 |
| 2014/0245005 | A1* | 8/2014 | Dottax | G06F 21/46 713/168 |
| 2014/0359290 | A1* | 12/2014 | Mccusker | H04L 9/321 713/168 |
| 2014/0359653 | A1* | 12/2014 | Thorpe | H04N 21/441 725/30 |
| 2015/0149767 | A1* | 5/2015 | Oualha | H04W 12/065 726/3 |
| 2015/0242616 | A1* | 8/2015 | Oprea | G06F 21/34 726/1 |
| 2015/0256247 | A1* | 9/2015 | Haley | H04B 7/18504 455/12.1 |
| 2016/0165432 | A1* | 6/2016 | Dubesset | H04W 76/12 455/433 |
| 2017/0019251 | A1* | 1/2017 | Jain | H04L 9/12 |
| 2017/0093566 | A1* | 3/2017 | Monni | G06F 21/62 |
| 2020/0374113 | A1* | 11/2020 | Noam | H04L 9/0637 |
| 2021/0368341 | A1* | 11/2021 | Liao | H04W 76/10 |
| 2023/0156704 | A1* | 5/2023 | Wang | H04L 1/1861 370/329 |

FOREIGN PATENT DOCUMENTS

| | | |
|---|---|---|
| GB | 2513260 A | 10/2014 |
| JP | H10126404 | 5/1998 |
| JP | 2005100255 A | 4/2005 |
| WO | 2002021766 | 3/2002 |
| WO | 2016075413 A1 | 5/2016 |
| WO | 2017168194 A1 | 10/2017 |

OTHER PUBLICATIONS

Peeters et al., "Threshold-Based Location-Aware Access Control," <https://www.cosic.esat.kuleuven.be/publications/article-1486.pdf>, Jul. 1, 2011, 17 pages.

Atwater et al., "Shatter: Threshold Cryptography to Protect Single Users with Multiple Devices," Jul. 2016, Proceedings of the 9th ACM Conference on Security & Privacy in Wireless and Mobile Devices, pp. 91-102 (abstract only).

Peeters et al., "Security Architecture for Things That Think," 2012, Katholieke Universiteit Leuven, pp. 1-145, 168 pages.

Shoup et al., "Practical Threshold Signatures, " Proceedings of EUROCRYPT, vol. 1807 of LNCS, pp. 207-220, Springer-Verlag, 2000, 14 pages.

Chaum et al., "Wallet Databases with Observers," Proceedings of CRYPTO '92, vol. 740 of LNCS, pp. 89-105, Springer-Verlag, 1992, 17 pages.

Desmedt et al., "Threshold Cryptosystems," Proceedings of CRYPTO, pp. 307-315, 1990, 9 pages.

Krawczyk et al., "HMAC: Keyed-Hashing for Message Authentication," Network Working Group, Feb. 1997, 11 pages.

Django, "Adding CAPTCHA Validation to your Forms," Tryolabs Blog, Mar. 2, 2012, 3 pages.

Suragana, "Password Recovery with CAPTCHA," DotNetFunda, Nov. 6, 2012, retrieved from <https://www.dotnetfunda.com/articles/show/2019/passwordrecovery-with-captcha>, 6 pages.

China National Intellectual Property Administration, "First Office Action," dated Jul. 2, 2021 in connection with Chinese Patent Application No. 201680088899.4, 12 pages (including translation).

China National Intellectual Property Administration, "Notice of Allowance," dated Feb. 22, 2022 In connection with Chinese Patent 201680088899.4, 4 pages (including translation).

Wikipedia, "Shamir's Secret Sharing," revised Sep. 28, 2016, retrieved from <https://en.wikipedia.org/wiki/Shami%27s_Secret_Sharing> on Mar. 24, 2022, 6 pages.

United States Patent and Trademark Office, "Non-Final Office Action, " dated Jun. 24, 2021 in connection with U.S. Appl. No. 16/328,497, 11 pages.

United States Patent and Trademark Office, "Final Office Action," dated Dec. 24, 2021 in connection with U.S. Appl. No. 16/328,497, 12 pages.

United States Patent and Trademark Office, "Notice of Allowance,"

(56) References Cited

OTHER PUBLICATIONS dated Apr. 20, 2022 in connection with U.S. Appl. No. 16/328,497, 8 pages.

* cited by examiner

TECHNOLOGIES FOR MULTIPLE DEVICE AUTHENTICATION IN A HETEROGENEOUS NETWORK

RELATED APPLICATIONS

This patent arises from a continuation of U.S. patent application Ser. No. 16/328,497 (now U.S. Pat. No. 11,438,147), filed on Feb. 26, 2019, and entitled "TECHNOLOGIES FOR MULTIPLE DEVICE AUTHENTICATION IN A HETEROGENEOUS NETWORK," which is a U.S. National Stage Patent Application under 35 U.S.C. § 371 of PCT Patent Application No. PCT/M2016/001520, filed on Sep. 30, 2016, and entitled "TECHNOLOGIES FOR MULTIPLE DEVICE AUTHENTICATION IN A HETEROGENEOUS NETWORK." U.S. patent application Ser. No. 16/328,497 and PCT Patent Application No. PCT/IB2016/001520 are hereby incorporated herein by reference in their entireties.

BACKGROUND

Typical authentication protocols for devices on a network, such as authentication protocols for authenticating one device to a server that provides access to a resource (e.g., a database), treat each device as if it has the same set of capabilities and features (e.g., performance, memory, communication capabilities, etc.) as any other device that may attempt to authenticate to the network. For example, the server may transmit a challenge to a device that is to be authenticated, and the device to be authenticated determines and transmits a response back to the server in the same format and manner as any other device would. In such systems, the determination of the response by the device to be authenticated is not based on any capabilities that are specific to that device, but rather could be generated by any other device that may attempt to authenticate with the server. In this way, the devices to be authenticated are treated as homogenous.

Some authentication protocols use multiple responses that are generated by multiple devices and combined in order to authenticate one of the devices to a server. However, these protocols also ignore any features that may be specific the particular devices that worked together to generate the combined response, and instead treat them as if they are homogenous. For example, one device may be unable to efficiently calculate the result of a cryptographic operation to be included in a response while another device may be unable to prompt a user for input or provide location information regarding the device or user. In view of these complications, such schemes utilize a lowest common denominator approach, obtaining the same type of information from each device and foregoing any additional information that may be available from one of the devices that could be useful in authenticating a user.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
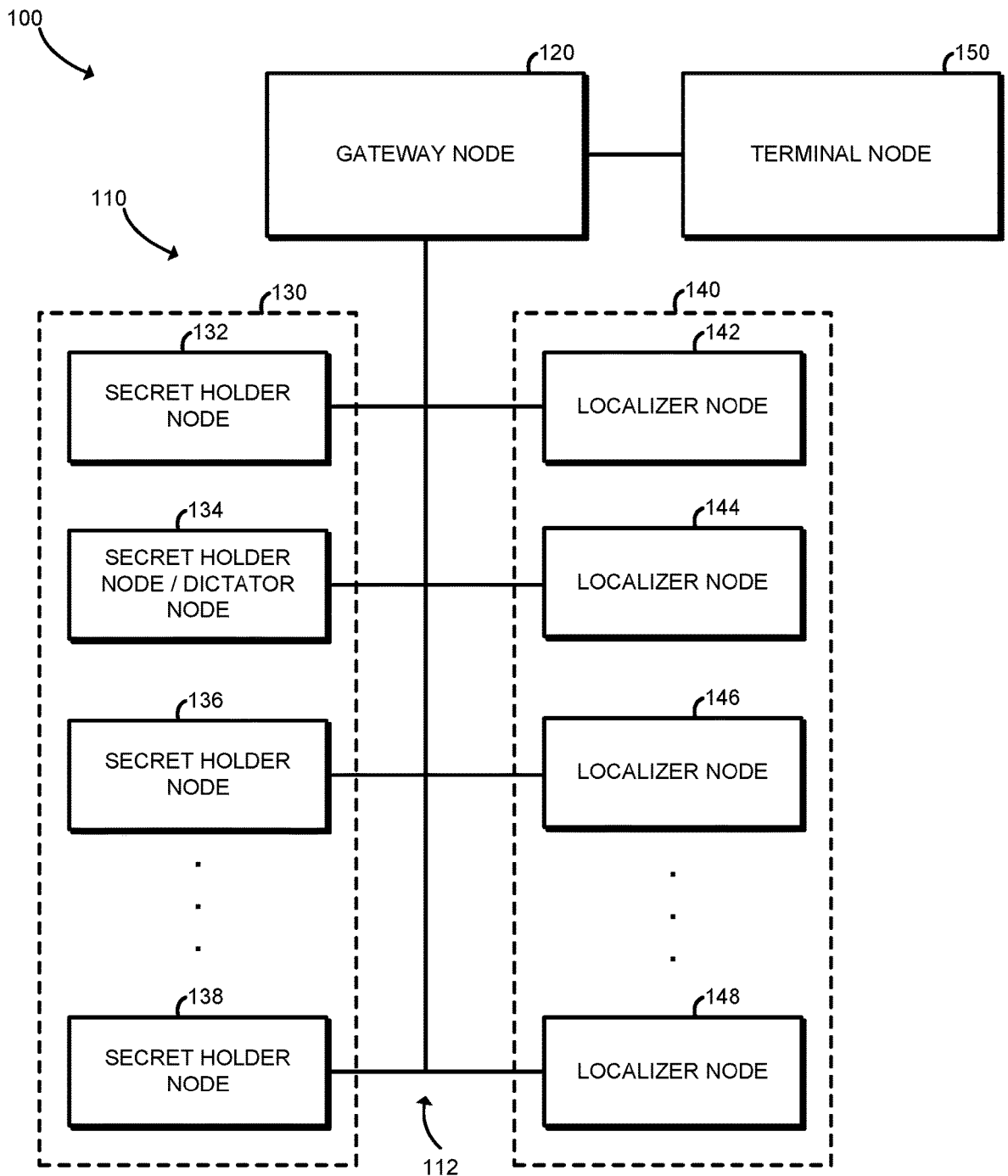
FIG. 1 is a simplified block diagram of at least one embodiment of a networked system for performing authentication using heterogeneous nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a networked system 100 for performing authentication includes a set of nodes 110. The nodes 110 illustratively include a gateway node 120, a set of secret holder nodes 130, a set of localizer nodes 140, and a terminal node 150. As such, the nodes 110 are heterogeneous, meaning they are to perform different functions. The nodes 110 are connected through a network 112. The gateway node 120 may be embodied as any compute device capable of receiving a request from the terminal node 150, broadcasting a credential request to the secret holder nodes 130 and localizer nodes 140, collecting their responses, combining the responses using a cryptographic function, and sending the combined response to the terminal node 150. The terminal node may be embodied as any compute device capable of requesting and verifying user credentials in an authentication process. The secret holder nodes 130 each may be embodied as any compute device capable of storing part of a set of user credentials, receiving a request from the gateway node, using part of the user credentials to perform a cryptographic function, and sending the result of the cryptographic function back to the gateway node 120. The set of secret holder nodes 130 includes a secret holder node 132, another secret holder node 134, which may perform the role of a dictator node, as described in more detail, another secret holder node 136, and yet another secret holder node 138. While four secret holder nodes 130, are shown, it should be understood that, in other embodiments, the number of secret holder nodes 130 may be different. The localizer nodes 140 each may be embodied as a compute device capable of performing a limited set of operations, and able to localize the user for authentication purposes. The set of localizer nodes 140 includes a localizer node 142, another localizer node 144, another localizer node 146, and yet another localizer node 148. Similar to the set of secret holder nodes 130, while four localizer nodes 140 are shown, it should be understood that in other embodiments, the number of localizer nodes 140 may differ.

In operation, the gateway node 120 generates a secret key and provides portions ("shares") of the secret key to each of the secret holder nodes 130 and localizer nodes 140. Subsequently, when a user wishes to authenticate to the terminal node 150, which may be representative of a server or other compute device that provides access to a resource (e.g., a bank account), the terminal node 150 sends an authentication request to the gateway node 120, which in turn, provides information from the authentication request to the various secret holder nodes 130 and localizer nodes 140. The secret holder nodes 130 and localizer nodes 140 then generate portions of a response to the authentication request based on their shares of the secret key, information from the authentication request, and any other information specific to the node 110 (e.g., location information from the localizer node(s) 140). The gateway node 120 then combines the responses. At least one of the secret holder nodes 130 is a dictator node (e.g., dictator node 134), meaning in order for the combined response to be complete, the gateway node 120 must receive a response from the dictator node 134 to be combined with responses from the other nodes 110. Once combined, the gateway node 120 provides the combined response to the terminal node as an authentication message. The terminal node 150 then performs an operation on the authentication message to verify it. The terminal node 150 then either provides access to the user or denies access, based on the result of the verification operation. By using a combination of different types of nodes 110 (e.g., secret holder nodes 130, at least one dictator node 134, and one or more localizer nodes 140), the system 100 takes advantage of the diverse capabilities of the nodes 110 rather than using the same type of information from each node 110, regardless of their capabilities. As such, the system 100 provides more accurate and efficient authentication services than in typical systems.

Figure 2:
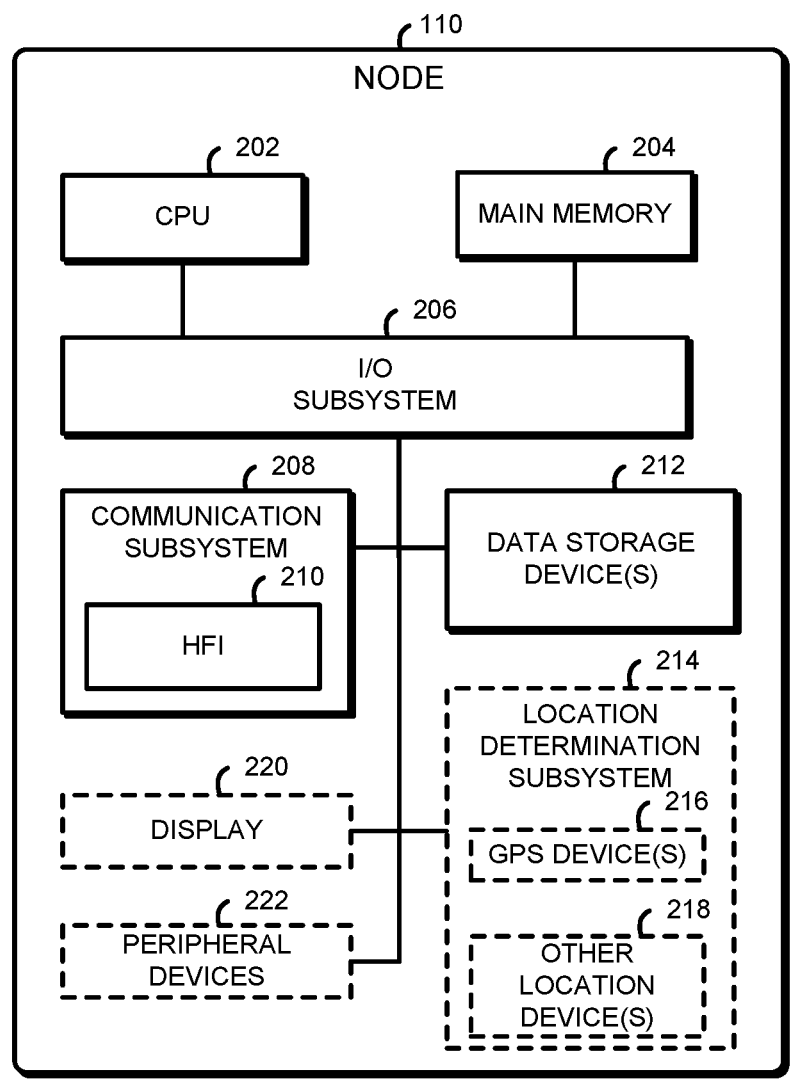
FIG. 2 is a simplified block diagram of at least one embodiment of a node of the system of FIG. 1.

Referring now to FIG. 2, each node 110 may be embodied as any type of compute device capable of performing the functions described herein, including generating an authentication request, generating a portion of a response to an authentication request, potentially including location information, combining the responses to the authentication request into an authentication message, and verifying the authentication message, depending on the role (e.g., terminal node 150, gateway node 120, secret holder node 130, dictator node 134, or localizer node 140) of the particular node 110. The node 110 may be embodied as a server, a server blade, a desktop computer, a notebook, a laptop computer, a netbook, an Ultrabook™, a wearable computing device, a smart phone, a personal digital assistant (PDA), an Internet appliance, an automated teller machine (ATM), and/or any other computing/communication device. As shown in FIG. 2, the illustrative node 110 includes a central processing unit (CPU) 202, a main memory 204, an input/output ("I/O") subsystem 206, a communication subsystem 208, and one or more data storage devices 212. Of course, the node 110 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 204, or portions thereof, may be incorporated in the CPU 202 in some embodiments.

The CPU 202 may be embodied as any type of processor capable of performing the functions described herein. For example, the CPU 202 may be embodied as a single or multi-core processor(s), digital signal processor, microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the node 110 such as identifications of the nodes 110 in the system 100, key data, credential data, location data, operating systems, applications, programs, libraries, and drivers. The memory 204 is communicatively coupled to the CPU 202 via the I/O subsystem 206, which may be embodied as circuitry and/or components to facilitate input/output operations with the CPU 202, the memory 204, and other components of the node 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the CPU 202, the memory 204, and other components of the node 110, on a single integrated circuit chip.

The communication subsystem 208 may be embodied as one or more devices and/or circuitry capable of enabling communications with one or more other compute devices, such as other nodes 110 or other compute devices. The communication circuitry 208 may be configured to use any one or more communication technology (e.g., wired or wireless communications) and associated protocols (e.g., Ethernet, Bluetooth®, Wi-Fi®, WiMAX, etc.) to effect such communication. In the illustrative embodiment, the communication subsystem 208 includes a host fabric interface (HFI) 210 which may be embodied as one or more add-in-boards, daughtercards, network interface cards, controller chips, chipsets, or other devices or circuitry to communicatively connect the node 110 to another compute device through the fabric.

The one or more data storage devices 212 may be embodied as any type of device or devices configured for short-term or long-term storage of data. As such, the one or more data storage devices 212 may be embodied as one or more solid state drives (SSDs), one or more hard disk drives (HDDs), memory devices and circuits, memory cards, or other data storage devices. The one or more data storage devices 212 may store identifications of the nodes 110 in the system 100, key data, credential data, location data, operating systems, applications, programs, libraries, and drivers as described in more detail herein.

Still referring to FIG. 2, the node 110 may additionally include a location determination subsystem 214, such as in embodiments in which the node 110 is to operate as a localizer node 140. The location determination subsystem 214 may be embodied as any one or more devices and/or circuitry capable of determining a geographic location of the node 110 and the user of the node 110. As such, the location determination subsystem 214 may include a global positioning system device 216, which may be embodied as any one or more devices and/or circuitry capable of determining a geographic location of the node 110 based on signals from GPS satellites. Additionally or alternatively, the location determination subsystem 214 may include one or more other location devices 218, such as devices and/or circuitry capable of determining the location of the node 110 based on one of a variety of methods, including recognizing an identifier (e.g., an identifier encoded in a radio frequency identification (RFID) signal) from a device at a known location, measuring the strength of wireless signals from one or more sources (e.g., wireless access points, cellular network towers, etc.) having known locations, measuring the distance from an object at a known location from time of arrival information, such as radio detection and ranging (RADAR), light detection and ranging (LIDAR), and/or other methods. In other embodiments, the location of the node 110 is static and stored in memory (e.g., the memory 204 or the data storage 212), and the location determination subsystem 214 is to detect the presence of the user within a predefined range of the node 110, such as through a camera or other sensor. In some embodiments, all or a portion of the location determination subsystem 214 may be included in or share components with the communication subsystem 208.

The node 110 may also include a display 220, which may be embodied as any type of display device on which information may be displayed to a user of the node 110. The display 220 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 220 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

In some embodiments, the node 110 may further include one or more peripheral devices 222. Such peripheral devices 222 may include any type of peripheral device commonly found in a compute device such as speakers, a mouse, a keyboard, and/or other input/output devices, interface devices, and/or other peripheral devices.

Referring back to FIG. 1, as described above, the nodes 110 are illustratively in communication via the network 112, which may be embodied as any number of various wired or wireless networks. For example, the network 112 may be embodied as, or otherwise include, a publicly-accessible global network such as the Internet, a cellular network, a wired or wireless wide area network (WAN), and/or a wired or wireless local area network (LAN). As such, the network 112 may include any number of additional devices, such as additional computers, routers, and switches, to facilitate communications among the nodes 110.

Figure 3:
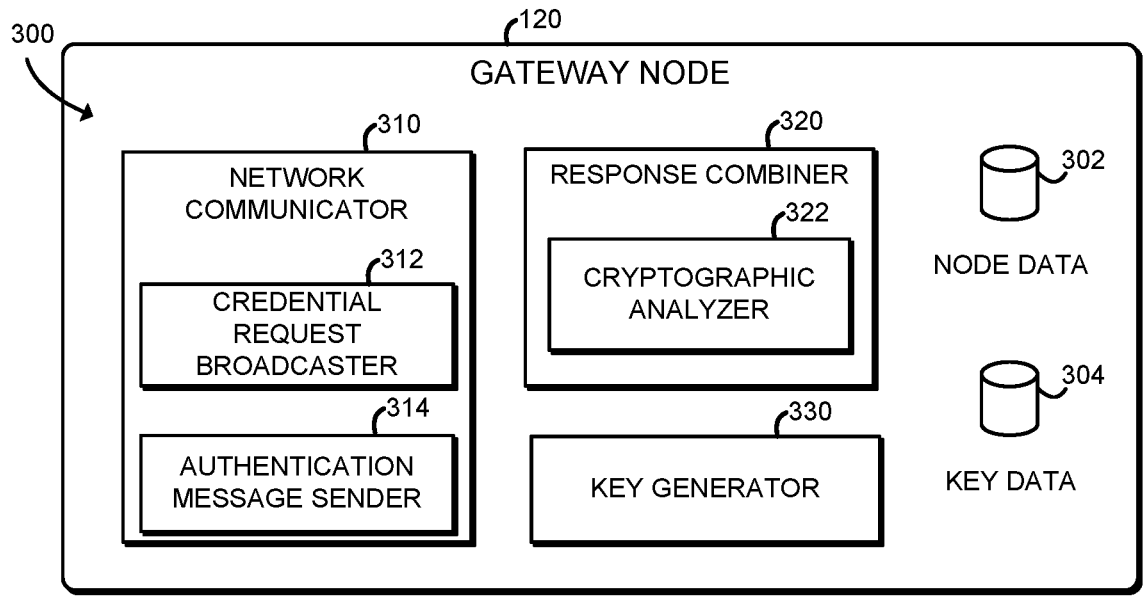
FIG. 3 is a simplified block diagram of at least one embodiment of an environment that may be established by a gateway node of the system of FIG. 1.

Referring now to FIG. 3, in use, the gateway node 120 may establish an environment 300. The illustrative environment 300 includes a network communicator 310, a response combiner 320, and a key generator 330. Each of the components of the environment 300 may be embodied as firmware, software, hardware, or a combination thereof. For example, the various components and logic of the environment 300 may form a portion of, or otherwise be established by, the CPU 202 or other hardware components of the gateway node 120. As such, in some embodiments, any one or more of the components of the environment 300 may be embodied as a circuit or collection of electrical devices (e.g., a network communicator circuit 310, a response combiner circuit 320, a key generator circuit 330, etc.). In the illustrative embodiment, the environment 300 additionally includes node data 302, which may be embodied as identifications of the nodes 110 connected to the gateway node 120 and their roles (e.g., secret holder node, dictator node, localizer node, terminal node). The environment 300 also includes key data 304, including one or more private keys, public keys, and/or verification keys used for encrypting, decrypting, signing, and/or verifying data transmitted to and/or from the nodes 110, as described in more detail herein.

In the illustrative embodiment, the network communicator 310, which may be embodied as hardware, firmware, software, virtualized hardware, emulated architecture, and/or a combination thereof as discussed above, is configured to distribute portions of a secret key to the nodes 110, receive an authentication request from the terminal node 150, broadcast information from the authentication request to the secret holder nodes 130 and localizer nodes 140, receive responses from the secret holder nodes 130 and localizer nodes, and send the an authentication message based on a combination of the responses to the terminal node 150 for verification. To do so, in the illustrative embodiment, the network communicator 310 includes a credential request broadcaster 312 and an authentication message sender 314.

The credential request broadcaster 312 is configured to receive an authentication request from the terminal node 150 and broadcast a credential request including information from the authentication request to the set of secret holder nodes 130, including one or more dictator nodes, and the set of localizer nodes 140. The authentication message sender 314 is configured to obtain a combined response from the response combiner 320 and send the combined response to the terminal node 150 in an authentication message. It should be appreciated that each of the credential request broadcaster 312 and the authentication message sender 314 may be separately embodied as hardware, firmware, software, virtualized hardware, emulated architecture, and/or a combination thereof. For example, the credential request broadcaster 312 may be embodied as a hardware component, while the authentication message sender 314 is embodied as a virtualized hardware component or as some other combination of hardware, firmware, software, virtualized hardware, emulated architecture, and/or a combination thereof.

The response combiner 320, which may be embodied as hardware, firmware, software, virtualized hardware, emulated architecture, and/or a combination thereof as discussed above, is configured to receive responses from the set of secret holder nodes 130 and the set of localizer nodes 140, verify the responses using verification keys stored in the key data 304, and combine the verified responses into an authentication message to be sent to the terminal node 150. To do so, in the illustrative embodiment, the response combiner 320 includes a cryptographic analyzer 322. The cryptographic analyzer 322, is configured to perform cryptographic operations on the responses, which represent shares or portions of a partly decrypted message, to verify their validity and combine them to generate a return value to be transmitted to the terminal node 150 in the authentication message. It should be appreciated that the cryptographic analyzer 322 may be embodied as hardware, firmware, software, virtualized hardware, emulated architecture, and/or a combination thereof.

The key generator 330, which may be embodied as hardware, firmware, software, virtualized hardware, emulated architecture, and/or a combination thereof as discussed above, is configured to generate a secret key and a public key. In the illustrative embodiment, the key generator 330 is configured to generate a set of ElGamal system keys for each user of the system 100. An ElGamal encryption system is an asymmetric key encryption system for public-key cryptography which is based on the Diffie-Hellman key exchange. Further, in the illustrative embodiment, the key generator 330 is configured to determine shares of the secret key to be distributed among the secret holder nodes 130.

Figure 4:
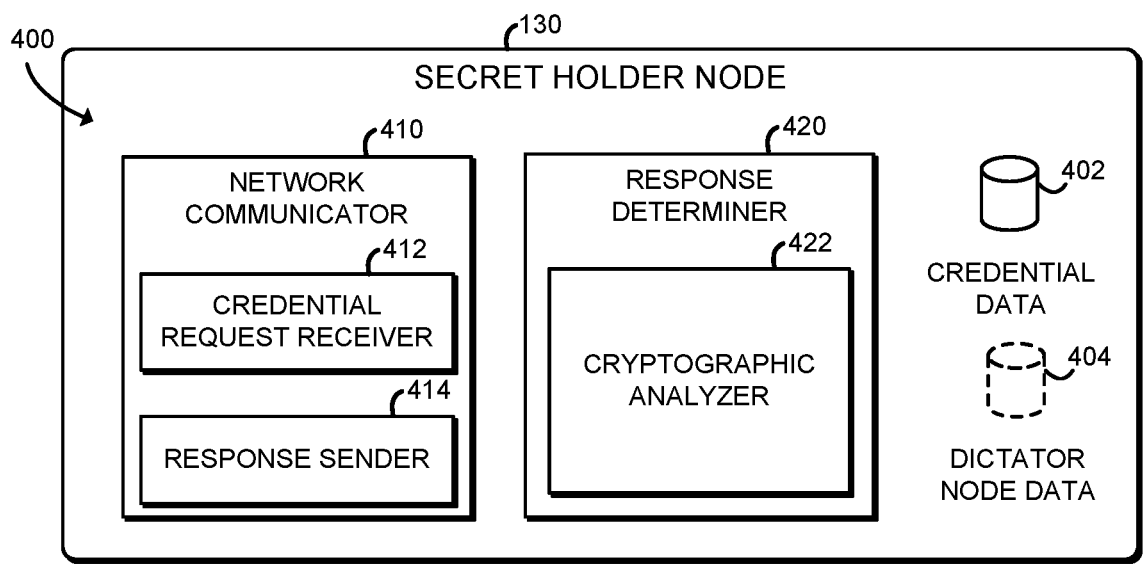
FIG. 4 is a simplified block diagram of at least one embodiment of an environment that may be established by a secret holder node of the system of FIG. 1.

Referring now to FIG. 4, in use, each secret holder node 130 may establish an environment 400. The illustrative environment 400 includes a network communicator 410 and a response determiner 420. Each of the components of the environment 400 may be embodied as firmware, software, hardware, or a combination thereof. For example, the various components and logic of the environment 400 may form a portion of, or otherwise be established by, the CPU 202 or other hardware components of the secret holder node 130. As such, in some embodiments, any one or more of the components of the environment 400 may be embodied as a circuit or collection of electrical devices (e.g., a network communicator circuit 410, a response determiner 420, etc.). In the illustrative embodiment, the environment 400 additionally includes credential data 402, which may be embodied as a share of a secret key distributed to the secret holder node 130 by the gateway node 120. Further, in embodiments in which the secret holder node 130 is to operate as a dictator node (e.g., the dictator node 134), the environment 400 includes dictator node data 404, which may be embodied as a special share of the secret key to be used by dictator nodes. As described in more detail herein, if the gateway node 120 sends an authentication message back to the terminal node 150 that does not include data from a response generated by a dictator node (e.g., the dictator node 134), the authentication message will be incomplete and will fail the authentication process.

In the illustrative embodiment, the network communicator 410, which may be embodied as hardware, firmware, software, virtualized hardware, emulated architecture, and/or a combination thereof as discussed above, is configured to receive a credential request from the gateway node 120 and transmit a response to the credential request determined by the response determiner 420. To do so, in the illustrative embodiment, the network communicator 410 includes a credential request receiver 412 and a response sender 414.

The credential request receiver is configured to receive a credential request that has been broadcasted to the secret holder node 130 by the gateway node 120. In the illustrative embodiment, the credential request includes information, such as one or more messages, that was originally included in an authentication request sent to the gateway node 120 by the terminal node 150. The credential request receiver 412 is configured to pass this information to the response determiner 420 to determine a response to the credential request, using the information supplied in the credential request and the credential data 402 and/or dictator node data 404. The response sender 414 is configured to receive a response determined by the response determiner and send it back to the gateway node 120 to be combined with responses from other secret holder nodes 130 and/or other nodes 110 (e.g., localizer nodes 140). It should be appreciated that each of the credential request receiver 412 and the response sender 414 may be separately embodied as hardware, firmware, software, virtualized hardware, emulated architecture, and/or a combination thereof. For example, the credential request receiver 412 may be embodied as a hardware component, while the response sender 414 is embodied as a virtualized hardware component or as some other combination of hardware, firmware, software, virtualized hardware, emulated architecture, and/or a combination thereof.

In the illustrative embodiment, the response determiner 420, which may be embodied as hardware, firmware, software, virtualized hardware, emulated architecture, and/or a combination thereof as discussed above, is configured to receive the credential request from the credential request receiver 412 and determine a response based on information included in the credential request and the credential data 402 and/or the dictator node data 404. In the illustrative embodiment, the response determiner 420 is configured to perform a cryptographic function using the information from the credential request and the credential data 402 and/or the dictator node data 404 to determine the response. To do so, in the illustrative embodiment, the response determiner 420 includes a cryptographic analyzer 422. The cryptographic analyzer 422 is configured to perform a cryptographic function, such as a combination of one or more exponential functions and one or more modulus functions to determine the response to the credential request, using the information from the credential request along with the credential data 402 and/or the dictator node data 404. It should be appreciated that the cryptographic analyzer 422 may be embodied as hardware, firmware, software, virtualized hardware, emulated architecture, and/or a combination thereof.

Figure 5:
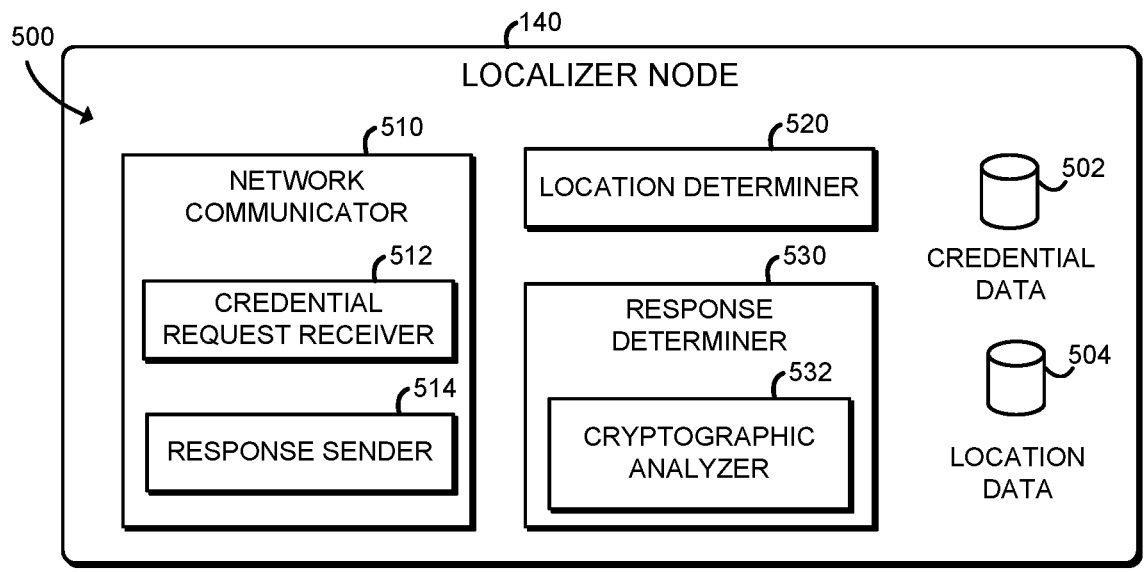
FIG. 5 is a simplified block diagram of at least one embodiment of an environment that may be established by a localizer node of the system of FIG. 1.

Referring now to FIG. 5, in use, each localizer node 140 may establish an environment 500. The illustrative environment 500 includes a network communicator 510, a location determiner 520, and a response determiner 530. Each of the components of the environment 500 may be embodied as firmware, software, hardware, or a combination thereof. For example, the various components and logic of the environment 500 may form a portion of, or otherwise be established by, the CPU 202 or other hardware components of the localizer node 140. As such, in some embodiments, any one or more of the components of the environment 500 may be embodied as a circuit or collection of electrical devices (e.g., a network communicator circuit 510, a location determiner circuit 520, a response determiner circuit 530, etc.). In the illustrative embodiment, the environment 500 additionally includes credential data 502, which may be embodied as identification information for the localizer node, a private key, and/or other information. The environment 500 also includes location data 504, which may be embodied as information about the location of the localizer node 140 and the user, such geographic coordinates, a name of a location, or other identifying information of a location.

In the illustrative embodiment, the network communicator 510, which may be embodied as hardware, firmware, software, virtualized hardware, emulated architecture, and/or a combination thereof as discussed above, is configured to receive a credential request from the gateway node 120 and transmit a response to the credential request determined by the response determiner 530. To do so, in the illustrative embodiment, the network communicator 510 includes a credential request receiver 512 and a response sender 514.

The credential request receiver 512 is configured to receive a credential request that has been broadcasted to the localizer node 140 by the gateway node 120. In the illustrative embodiment, the credential request includes information, such as one or more messages, that was originally included in an authentication request sent to the gateway node 120 by the terminal node 150. The credential request receiver 512 is configured to pass this information to the response determiner 530 to determine a response to the credential request, using the information supplied in the credential request, the credential data 502, and the location data 504. The response sender 514 is configured to receive a response determined by the response determiner 530 and send it back to the gateway node 120 to be combined with responses from the secret holder nodes 130 and/or other nodes 110 (e.g., other localizer nodes 140). It should be appreciated that each of the credential request receiver 512 and the response sender 514 may be separately embodied as hardware, firmware, software, virtualized hardware, emulated architecture, and/or a combination thereof. For example, the credential request receiver 512 may be embodied as a hardware component, while the response sender 514 is embodied as a virtualized hardware component or as some other combination of hardware, firmware, software, virtualized hardware, emulated architecture, and/or a combination thereof.

In the illustrative embodiment, the location determiner 520, which may be embodied as hardware, firmware, software, virtualized hardware, emulated architecture, and/or a combination thereof as discussed above, is configured to determine a location of a user in proximity to the localizer node. In the illustrative embodiment, the location determiner 520 is embodied as, includes, or uses the location determination subsystem 214 to determine the location of the user, such as by sensing the presence of the user, based on a signal from a device associated with the user through a close-range wireless signal (e.g., Bluetooth, Zigbee, RFID, NRC, etc.), visually identifying the user, or otherwise detecting the presence of the user, and determining the present location of the localizer node 140 and the user, such as by determining geographic coordinates based on signals from GPS satellites, by identify signals or measuring the strength of signals originating from known locations (e.g., access points, cell towers, etc.) and/or other methods supported by the location determination subsystem 214.

In the illustrative embodiment, the response determiner 530, which may be embodied as hardware, firmware, software, virtualized hardware, emulated architecture, and/or a combination thereof as discussed above, is configured to receive the credential request from the credential request receiver 512 and determine a response based on information included in the credential request, the credential data 502, and the location data 504. In the illustrative embodiment, the response determiner 530 is configured to perform a cryptographic function using the information from the credential request, the credential data 502, and the location data 504 to determine the response. To do so, in the illustrative embodiment, the response determiner 530 includes a cryptographic analyzer 532. The cryptographic analyzer 532 in configured to perform a cryptographic function, such as a cryptographic hash that combines the information from the credential request message, the credential data 502, and the location data 504 to determine the response to the credential request. It should be appreciated that the cryptographic analyzer 532 may be embodied as hardware, firmware, software, virtualized hardware, emulated architecture, and/or a combination thereof.

Figure 6:
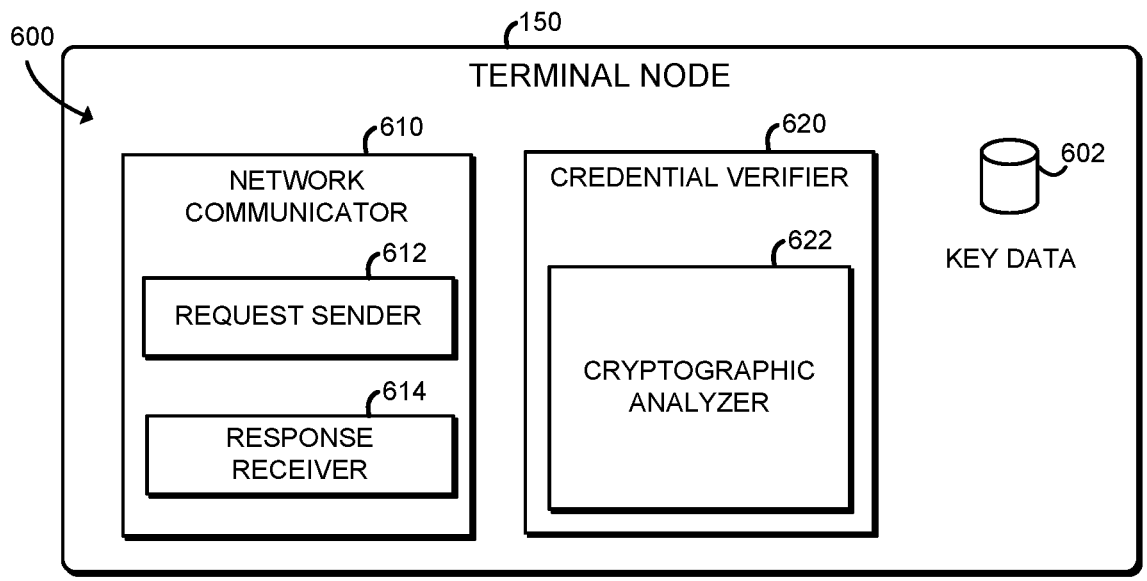
FIG. 6 is a simplified flow diagram of at least one embodiment of an environment that may be established by a terminal node of the system of FIG. 1.

Referring now to FIG. 6, in use, the terminal node 150 may establish an environment 600. The illustrative environment 600 includes a network communicator 610 and a credential verifier 620. Each of the components of the environment 600 may be embodied as firmware, software, hardware, or a combination thereof. For example, the various components and logic of the environment 600 may form a portion of, or otherwise be established by, the CPU 202 or other hardware components of the terminal node 150. As such, in some embodiments, any one or more of the components of the environment 600 may be embodied as a circuit or collection of electrical devices (e.g., a network communicator circuit 610, a credential verification circuit 620, etc.). In the illustrative embodiment, the environment 600 additionally includes key data 602, which may be embodied as verification keys, such as verification keys associated with the localizer nodes 140, usable in verifying location information generated by one or more of the localizer nodes 140 included in the authentication message from the gateway node 120.

In the illustrative embodiment, the network communicator 610, which may be embodied as hardware, firmware, software, virtualized hardware, emulated architecture, and/or a combination thereof as discussed above, is configured to communicate with the gateway node 120 to authenticate a user associated with the secret holder nodes 130 and at least one of the localizer nodes 140 and, in response to authenticating the user, provide access to a resource, such as bank account information, a database, a website, or other data and/or services. To do so, in the illustrative embodiment, the network communicator 610 includes a request sender 612 and a response receiver 614.

The request sender 612 is configured to transmit an authorization request to the gateway node 120 to prompt the gateway node 120 receive credential information (e.g., responses based on the credential data 402, 502) from the secret holder nodes 130 and localizer nodes 140. The response receiver 614 is configured to receive the authentication message from the gateway node 120 and provide the authentication message to the credential verifier 620 for analysis. It should be appreciated that each of the request sender 612 and the response receiver 614 may be separately embodied as hardware, firmware, software, virtualized hardware, emulated architecture, and/or a combination thereof. For example, the request sender 612 may be embodied as a hardware component, while the response receiver 614 is embodied as a virtualized hardware component or as some other combination of hardware, firmware, software, virtualized hardware, emulated architecture, and/or a combination thereof.

In the illustrative embodiment, the credential verifier 620, which may be embodied as hardware, firmware, software, virtualized hardware, emulated architecture, and/or a combination thereof as discussed above, is configured to obtain the authentication message from the response receiver 614 and verify the authentication message. To do so, the credential verifier includes a cryptographic analyzer 622, which may be configured to perform cryptographic operations using the key data and the authentication message to verify the authentication message.

Figure 7:
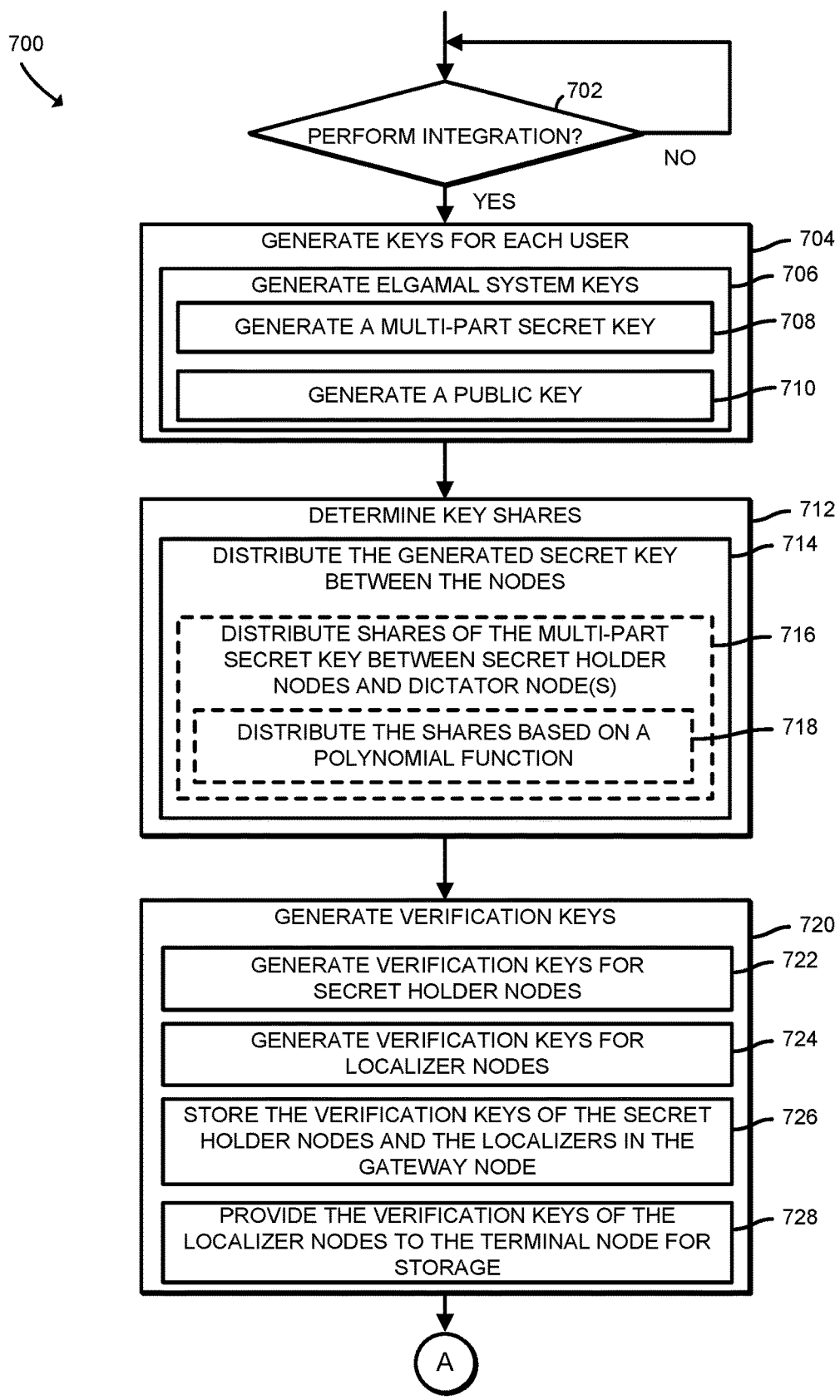
FIGS. 7-9 are a simplified flow diagram of at least one embodiment of a method for performing integration of responses from multiple nodes in the network that may be performed by the gateway node of the system of FIG. 1.

Referring now to FIG. 7, in use, the gateway node 120 may perform a method 700 for integrating information from the various nodes 110 to enable a user to authenticate to the terminal node 150. The method 700 begins with block 702, in which the gateway node 120 determines whether to perform integration of information from the nodes 110. In the illustrative embodiment, the gateway node 120 may determine to perform integration in response to a request to do so from a user, another device, or at a predefined time. Additionally or alternatively, the gateway node 120 may determine to perform integration based on other factors. Regardless, if the gateway node 120 determines to perform integration, the method 700 advances to block 704, in which the gateway node 120 generates keys for each user. In doing so, in the illustrative embodiment, the gateway node 120 generates ElGamal system keys, as indicated in block 706. In the illustrative embodiment, the gateway node 120 generates a multi-part secret key, in block 708 and generates a public key in block 710. In one embodiment, in which the gateway node 120 is to perform additive integration, the gateway node 120 generates a secret key, as follows:

$$SK = SK_1 + SK_D \quad \text{(Equation 1)}$$

In Equation 1, SK represents the secret key, $SK_1$ represents a part of the secret key shared between secret holder nodes 130, and $SK_D$ represents part of the secret key stored by a dictator node (e.g., the dictator node 134). The gateway node 120 may generate the public key as follows:

$$y = g^{SK} \bmod p \quad \text{(Equation 2)}$$

In Equation 2, y represents the public key, p is a prime number, and g is a primitive root of 1 modulo p.

In another embodiment, in which the gateway node 120 is to perform multiplicative integration, the gateway node 120 generates the public key as described above and generates the secret key as follows:

$$SK = SK_1 \cdot SK_D \quad \text{(Equation 3)}$$

In Equation 3, SK represents the secret key, $SK_1$ represents a part of the secret key shared between secret holder nodes 130, and $SK_D$ represents part of the secret key stored on a dictator node (e.g., the dictator node 134).

After generating the keys, the method 700 advances to block 712 in which the gateway node 120 determines key shares. In doing so, in the illustrative embodiment, the gateway node 120 distributes the generated secret key, SK, between the nodes 110, as indicated in block 714. In the illustrative embodiment, the gateway node 120 distributes shares of the multi-part secret key between the secret holder nodes 130 and the dictator nodes (e.g., the dictator node 134), as indicated in block 716. The gateway node 120 may distribute the shares based on a polynomial function, as indicated in block 718. As an example, in the additive integration embodiment, the gateway node 120 distributes the secret key, SK, between the nodes using the polynomial function F(x), as follows:

$$\deg F(x) = k-1 \quad \text{(Equation 4)}$$

$$F(0) = SK1 = SK - SK_D \quad \text{(Equation 5)}$$

$$F(x) = f_{k-1}x^{k-1} + f_{k-1}x^{k-1} + \ldots + f_1 x + SK_1 \quad \text{(Equation 6)}$$

The gateway node 120 assigns a secret share, SSi, for each secret holder node 130 as follows:

$$SS_i = F(x=ID_i) = f_{k-1}ID_i^{k-1} + f_{k-2}ID_i^{k-2} + + f_1 ID_i + SK_1 \bmod q \quad \text{(Equation 7)}$$

In this embodiment, the gateway node 120 assigns $SK_D$ as the secret share of the dictator node 134.

In embodiments in which the gateway node 120 is to perform multiplicative integration, the gateway node 120 performs similar operations except the polynomial for distributing the secret key between the secret holder nodes 130 and dictator node 134 differs, as follows:

$$F(0) = SK1 = SK \cdot (SK_D)^{-1} \quad \text{(Equation 8)}$$

After determining the key shares, the method 700 advances to block 720, in which the gateway node 120 generates verification keys. In doing so, in the illustrative embodiment, the gateway node 120 generates verification keys for the secret holder nodes 130, as indicated in block 722. Additionally, in the illustrative embodiment, the gateway node 120 generates verification keys for the localizer nodes 140, as indicated in block 724. The gateway node 120, in the illustrative embodiment, stores the verification keys of the secret holder nodes 130 and the localizer nodes 140 in the gateway node (e.g., in the key data 304), as indicated in block 726. Additionally, in the illustrative embodiment, the gateway node 120 provides the verification keys of the localizer nodes 140 to the terminal node 150 for storage (e.g., in the key data 602). In the illustrative embodiment, the gateway node 120 may obtain values from the different nodes 110 by different channels. As such, in the illustrative embodiment, the gateway node 120 verifies calculations performed by each node 110 to increase the reliability of the communications and the authentication process in general. The gateway node 120 may generate a verification key for each secret holder node 130 as follows:

$$VK_i = \{v^{SS_i}\} \quad \text{(Equation 9)}$$

In the above equation, $VK_i$ is the verification key for the ith secret holder node 130, v is a random constant, and $SS_i$ is the secret share of the ith secret holder node 130. Further, in the illustrative embodiment, the gateway node 120 generates the verification key for each localizer node 140 as follows:

$$VK^*_i = \{v^{SL_i}\} \quad \text{(Equation 10)}$$

In the above equation, $SL_i$ is the secret key of the ith localizer node.

Figure 8:
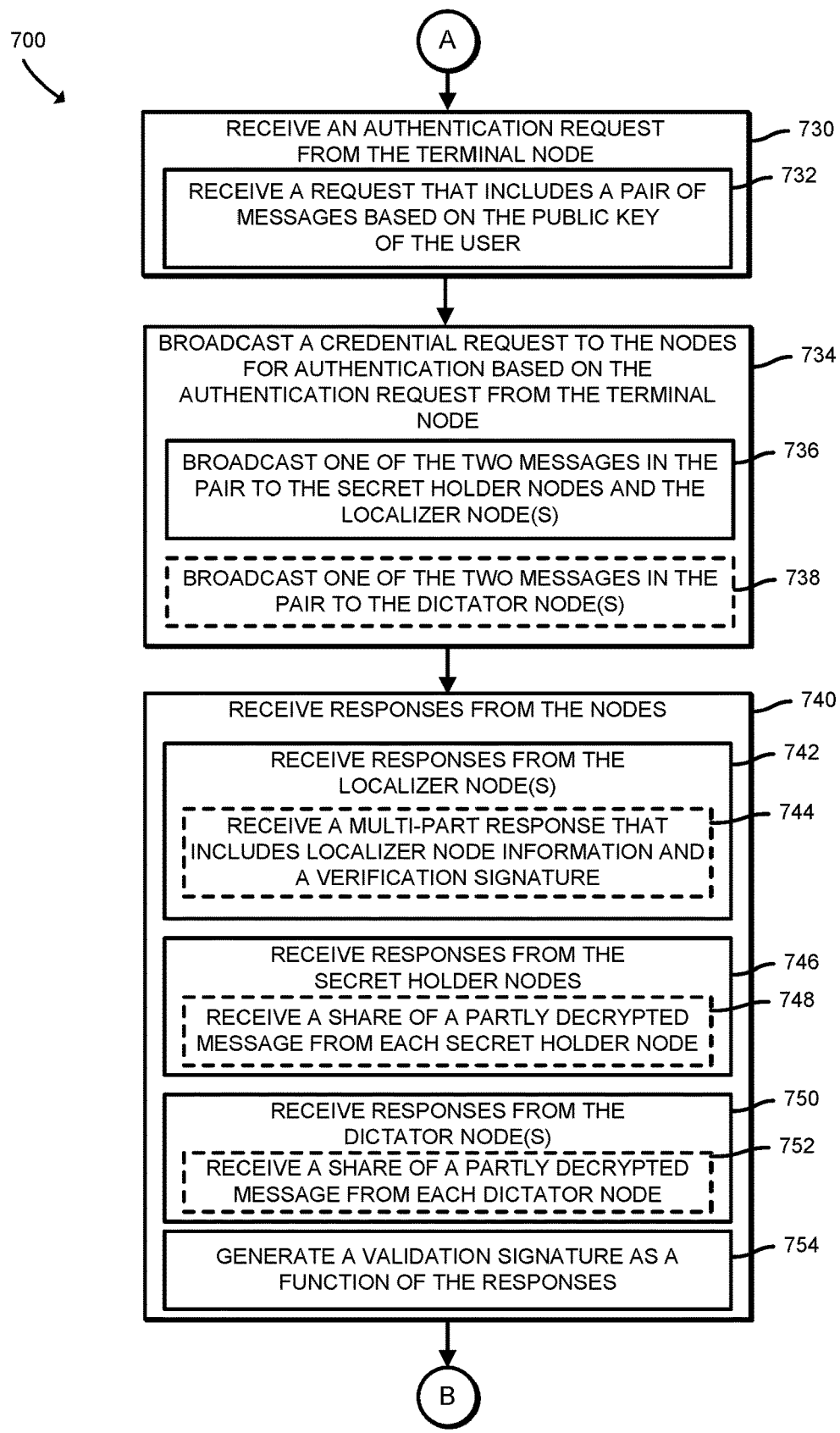

Referring now to FIG. 8, after generating the verification keys, the method 700 advances to block 730, in which the gateway node 120 receives an authentication request from the terminal node 150, such as an authentication request to provide information to authenticate a user of the secret holder nodes 130 and the localizer nodes 140. In the illustrative embodiment, as indicated in block 732, the gateway node 120 receives an authentication request that includes a pair of messages that are based on the public key for the user (e.g., the public key generated in block 710). The messages may include two messages, a and b, as follows:

$$a = g^k \bmod p \quad \text{(Equation 11)}$$

$$b = my^k \bmod p \quad \text{(Equation 12)}$$

In the above equations, y represents the public key, p is a prime number, and g is a primitive root of 1 modulo p, as described with reference to FIG. 2. Further, k is a random integer that is less than p−1.

After receiving the authorization request from the terminal node 150, the method 700 advances to block 734 in which the gateway node 120 broadcasts a credential request to the nodes 110 for authentication based on the authentication request. In doing so, the gateway node 120 may broadcast one of the two messages (e.g., the "a" message) in the pair to the secret holder nodes 130 and to the localizer nodes 140, as indicated in block 736. Additionally, the gateway node 120 may broadcast one of the two messages (e.g., the "a" message) to the dictator nodes (e.g., the dictator node 134), as indicated in block 738. Stated differently, in embodiments in which the gateway node 120 is to perform additive integration, the gateway node 120 broadcasts the message to the secret holder nodes 130, the dictator node 134, and the localizer nodes 140, while in the embodiments in which the gateway node 120 is to perform multiplicative integration, the gateway node 120 sends the message to the localizer nodes 140 and all of the secret holder nodes 130, except for the dictator nodes (e.g., the dictator node 134).

After broadcasting the credential request, the method 700 advances to block 740 in which the gateway node 120 receives responses from the nodes 110. In doing so, the gateway node 120 may receive responses from the localizer nodes 140, as indicated in block 742. In the illustrative embodiment, the gateway node 120 receives a multi-part response that includes localizer node information (e.g., localizer node identification, location information, time stamps, etc.) and a verification signature, which is calculated by the localizer node 140 based on a hash of the localizer node information and the private key $SK_{Li}$ of the localizer node 140, as described in more detail with reference to FIG. 11.

In block 746, the gateway node 120 may receive responses from the secret holder nodes 130. In doing so, as indicated in block 748, the gateway node 120 may receive a share of a partly decrypted message from each secret holder node 130. In block 750, the gateway node 120 may receive responses from the dictator nodes (e.g., the dictator node 134). In doing so, the gateway node 120 may receive a share of a partly decrypted message from each dictator node 134. In the illustrative embodiment, each secret holder node 130 calculates and sends to the gateway node 120 a share, $Part_{ai}$, of a partly decrypted authentication message, as follows:

$$Part_{ai} = a^{SS_i} \bmod p \quad \text{(Equation 13)}$$

Further, in the illustrative embodiment, each dictator node (e.g., the dictator node 134) calculates and sends to the gateway node 120 a share, $Part_D$, of the partly decrypted authentication message, as follows:

$$Part_D = a^{SK_D} \bmod p \quad \text{(Equation 14)}$$

Additionally, the gateway node 120 may generate a validation signature as a function of the responses, as indicated in block 754. In the embodiments in which the gateway node 120 is to perform additive integration, the gateway node 120 may generate the validation signature as follows:

$$VV_i = VV_{i,1}, VV_{i,2} \quad \text{(Equation 15)}$$

To implement the above, the gateway node 120 chooses a random number, r, and executes the following equations:

$$v' = v^r \bmod p \quad \text{(Equation 16)}$$

$$v'_i = v^{SS_i} \bmod p \quad \text{(Equation 17)}$$

$$t = a^r \bmod p \quad \text{(Equation 18)}$$

$$VV_{i,1} = \text{Hash}(v, a, v'_i, Part_{ai}, v', t) \quad \text{(Equation 19)}$$

$$VV_{i,2} = SS_i * VV_{i,1} + r \quad \text{(Equation 20)}$$

Figure 9:
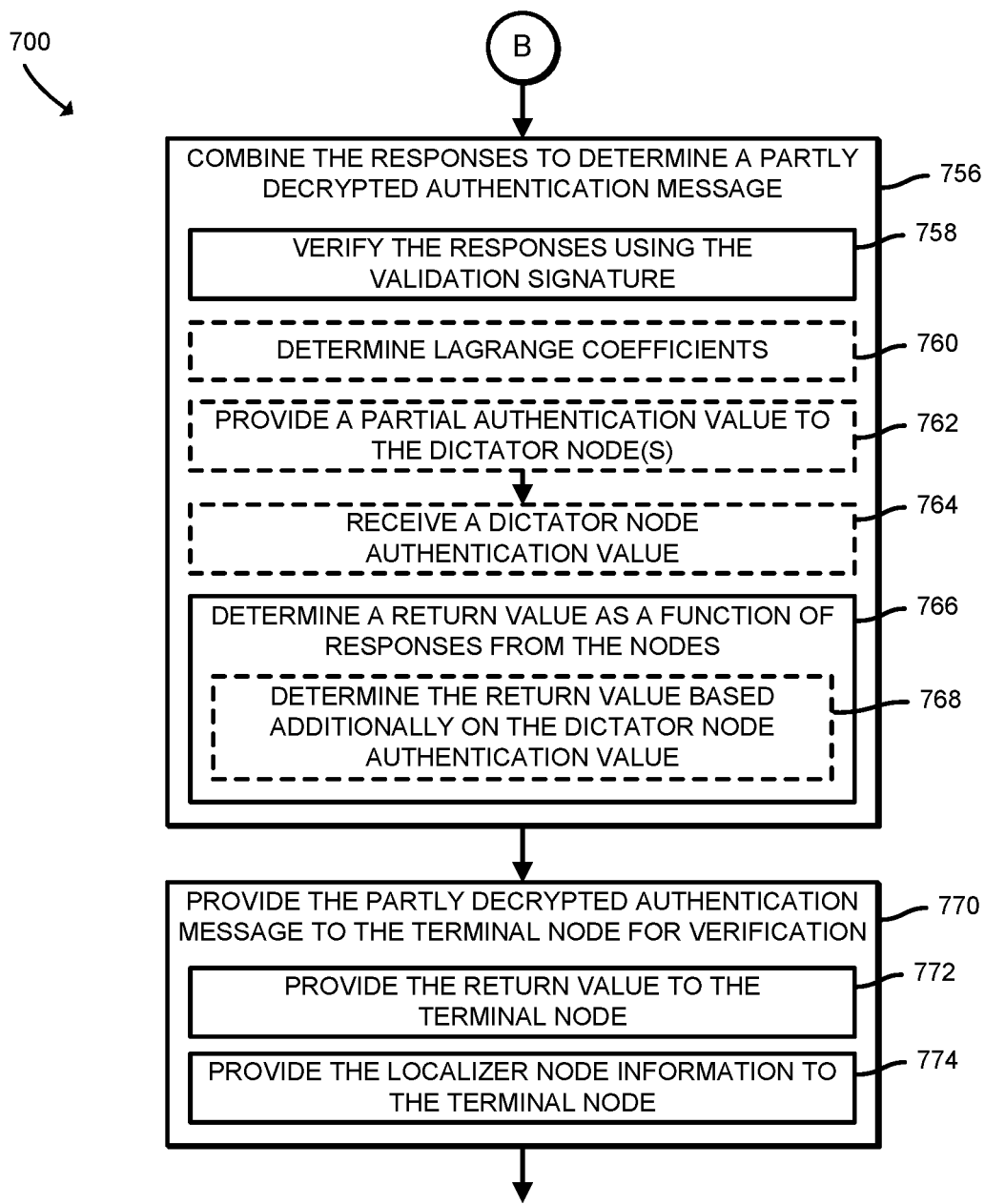

Referring now to FIG. 9, after the gateway node 120 has received responses from the nodes 110, the method 700 advances to block 756 in which the gateway node 120 combines the responses to determine a partly decrypted authentication message. In doing so, in block 758, the gateway node 120 may verify the responses using the validation signature described above. In the illustrative embodiment, the gateway node 120 determines whether every received response, $Part_{ai}$, satisfies the following equation:

$$VV_{i,1} =? = \text{Hash}(v, a, v'_i, Part_{ai}, v^{VV_{i,2}} * * v'^{-VV_{i,1}}_I, a^{VV_{i,2}}, Part_{ai}^{-VV_{i,1}}) \quad \text{(Equation 21)}$$

In the above comparison, $v'_i$ is equal to $VK_i$. In block 760, after verifying that the responses satisfy the equation above, the gateway node 120 may calculate Lagrange coefficients, $\lambda_{x\_i}$, for interpolation of a function, F(0), using an interpolation procedure as follows:

$$F(0) = \Sigma_{i=1}^k F(x_i) \lambda_{x\_i} \quad \text{(Equation 22)}$$

In the above equations, $x_i$ is equal to $ID_i$ and i is the number of secret holder nodes 130 that took part in responding to the broadcasted credential request described in block 734 above.

In some embodiments, such as embodiments in which the gateway node 120 is to perform multiplicative integration rather than additive integration, the gateway node 120 may provide a partial authentication value, aPr', to the dictator node 134, as follows:

$$aPr' = \prod_{i=1}^{k} (Part_i)^{\lambda_{ID_i}} Part_D \bmod p \quad \text{(Equation 23)}$$

After sending the value aPr' to the dictator node 134, the gateway node 120 may receive an authentication value, aPr, from the dictator node 134, as indicated in block 764. The dictator node 134 may calculate the authentication value, aPr, as follows:

$$aPr=(aPr')^{SK_D} \quad \text{(Equation 24)}$$

In embodiments in which the gateway node 120 is to perform additive integration, the gateway node 120 calculates the authentication value, aPr', according to Equation 23. In block 766, the gateway node 120 determines a return value, ret, as a function of the responses from the nodes 110, as follows:

$$ret = \frac{b}{aPr} \bmod p \quad \text{(Equation 25)}$$

As indicated in block 768, the gateway node 120 may determine the return value based additionally on the dictator node authentication value (e.g., those embodiments in which the dictator node 134 determines the authentication value, aPr, from the partial authentication value, aPr').

After combining the responses to determine the partly decrypted authentication message, the gateway node provides the partly decrypted authentication message to the terminal node 150, in block 770. In doing so, in the illustrative embodiment, the gateway node 120 provides the return value, ret, to the terminal node 150, as indicated in block 772. Further, as indicated in block 774, the gateway node 120 provides the localizer node information, $LI_i$, from each localizer node 140 to the terminal node 150 with the verification information VL, determined as follows:

$$VL=XOR(VL_i) \quad \text{(Equation 26)}$$

Figure 10:
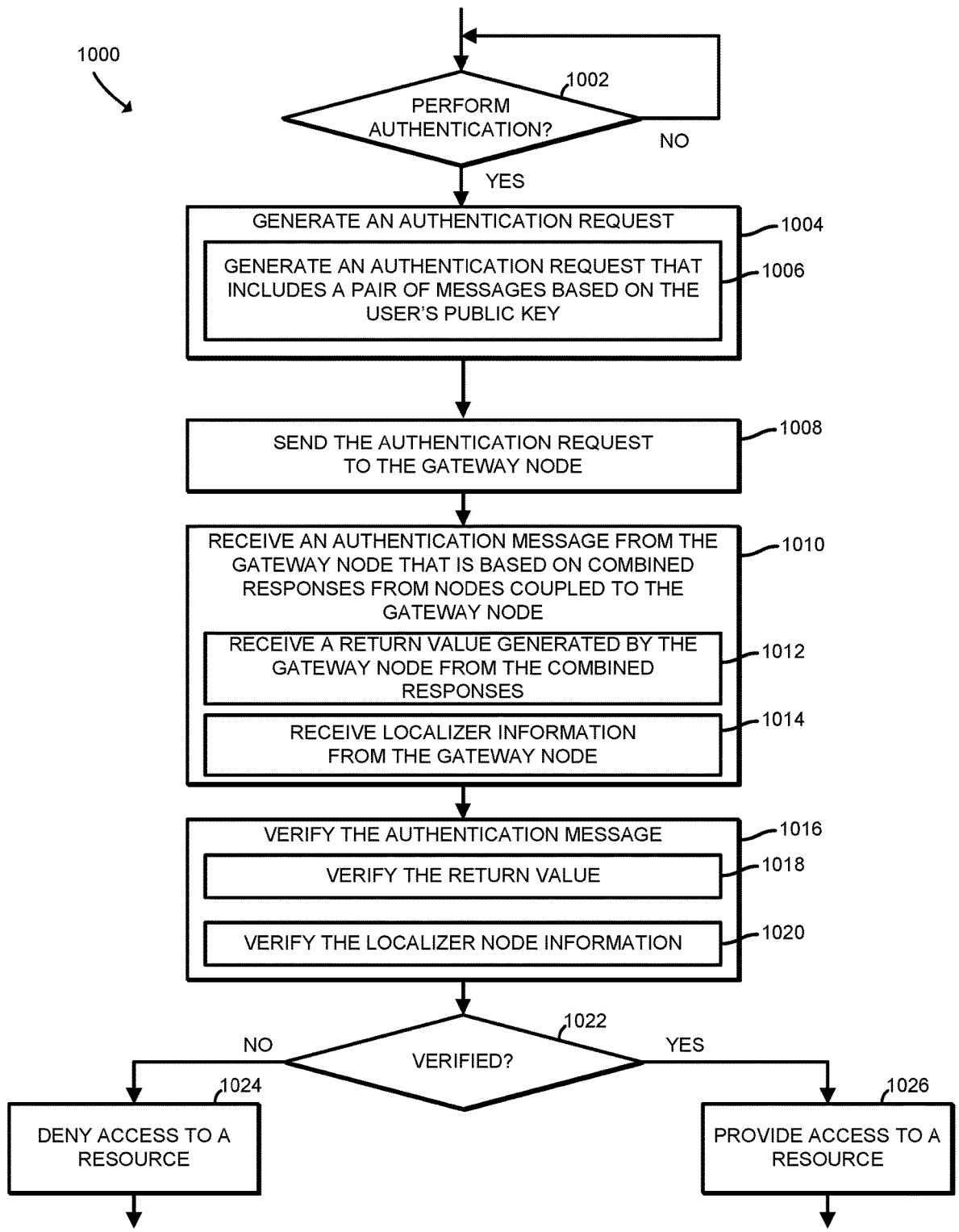
FIG. 10 is a simplified flow diagram of at least one embodiment of a method for performing authentication that may be performed by the terminal node of the system of FIG. 1.

Referring now to FIG. 10, in use, the terminal node 150 may perform a method 1000 for authenticating a user of the nodes 110 connected to the gateway node 120. The method 1000 begins with block 1002 in which the terminal node 150 determines whether to perform authentication. The terminal node 150 may determine to perform authentication in response to detecting that the user has requested access to one or more resources protected by the terminal node 150 or based on other factors. Regardless, in response to a determination to perform authentication, the method 1000 advances to block 1004 in which the terminal node 150 generates an authentication request. In doing so, as indicated in block 1006, in the illustrative embodiment, the terminal node 150 generates an authentication request that includes a pair of messages (e.g., messages a and b) based on the user's public key (e.g., the public key generated by the gateway node 120 in block 710). In the illustrative embodiment, the terminal node 150 generates the pair of messages pursuant to Equations 11 and 12 described above. In other embodiments, the terminal node 150 may generate a request that includes other information. Regardless, after generating the authentication request, the terminal node 150 sends the authentication request to the gateway node 120 in block 1008.

Subsequently, in block 1010, the terminal node 150 receives an authentication message from the gateway node 120 that is based on combined responses from the nodes 110 (e.g., the secret holder nodes 130, the dictator node 134, and the localizer nodes 140) connected to the gateway node 120. In doing so, as indicated in block 1012, the terminal node 150 receives a return value generated by the gateway node 120 from the combined responses. Additionally, as indicated in block 1014, the terminal node 150 receives localizer node information from the gateway node 120. After the terminal node 150 has received the authentication message from the gateway node 120, the method 1000 advances to block 1016, in which the terminal node 150 verifies the authentication message. In doing so, as indicated in block 1018, the terminal node 150 verifies the return value. Additionally, as indicated in block 1020, the terminal node 150 verifies the localizer node information. For example, in the illustrative embodiment, the terminal node 150 checks the value of the verification information, VL, as follows:

$$VL=?=XOR(Hash(LI_i,SK_L)) \quad \text{(Comparison 27)}$$

Further to the example above, in the illustrative embodiment, if the above condition is true, the terminal node checks the return value included in the authentication message as follows:

$$m=?=\text{ret} \bmod p \quad \text{(Comparison 28)}$$

If the above conditions are true, then the terminal node 150 determines that the authentication message is verified. In block 1022, the terminal node 150 takes an action depending on whether the authentication message is verified. If the authentication message is not verified, the terminal node 150 denies access to the resource, as indicated in block 1024. Otherwise, the terminal node 150 provides access to the resource (e.g., providing information from a database, providing services to manage a bank account, etc.), as indicated in block 1026.

Figure 11:
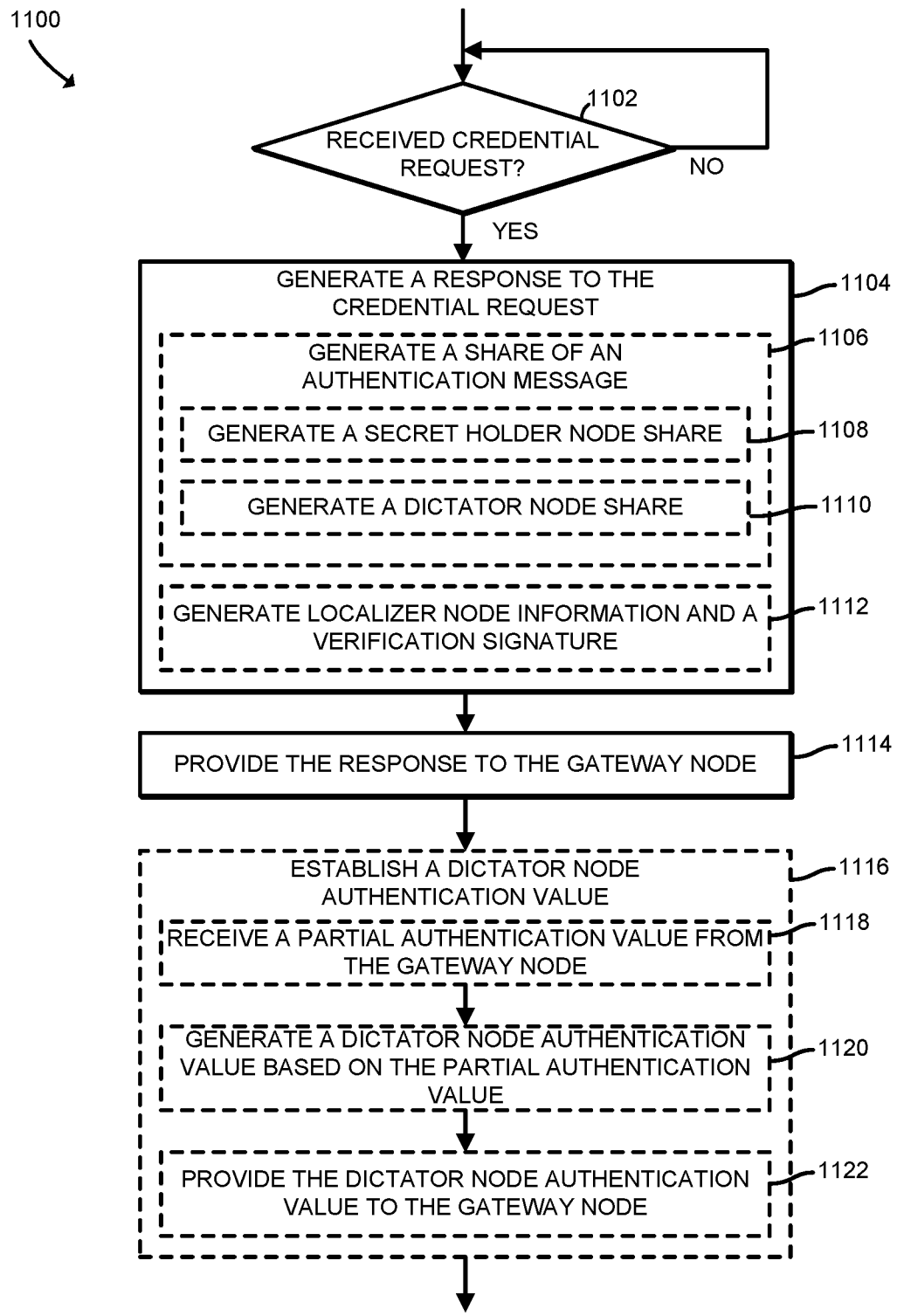
FIG. 11 is a simplified flow diagram of at least one embodiment of a method for generating a response to a credential request that may be performed by one of the nodes of the system of FIG. 1.

Referring now to FIG. 11, in use, a node 110, such as a secret holder node 130, the dictator node 134, or a localizer node 140 may perform a method 1100 for generating a response to a credential request. The method 1100 begins with block 1102 in which the node 110 determines whether a credential request has been received from the gateway node 120. If so, the method 1100 advances to block 1104 in which the node 110 generates a response to the credential request. In doing so, the node 110 may generate a share of an authentication message, as indicated in block 1106. As indicated in block 1108, if the node 110 is a secret holder node 130, the node 110 may generate a secret holder node share, as described above with reference to blocks 746 and 748 of FIG. 8. If the node 110 is a dictator node (e.g., the dictator node 134), as indicated in block 1110, the node 110 may generate a dictator node share, as described above with reference to blocks 750 and 752 of FIG. 8. Alternatively, as indicated in block 1112, if the node 110 is a localizer node 140, the node 110 may generate localizer node information and a verification signature, as described above with reference to blocks 742 and 744 of FIG. 8.

After generating the response to the credential request, the node 110 provides the response to the gateway node 120. Additionally, if the node 110 is a dictator node (e.g., the dictator node 134), the node 110 may establish a dictator node authentication value, as indicated in block 1116. In doing so, the node 110 may receive a partial authentication value, aPr', from the gateway node 120, as indicated in block 1118. This operation corresponds with the operations of the gateway node 120 in block 762 of FIG. 9. Subsequently, the node 110 may generate a dictator node authentication value, aPr, based on the partial authentication value, as indicated in block 1120. In the illustrative embodiment, the node 110 calculates the dictator node authentication value according to Equation 24, described above with reference to block 764 of FIG. 9. Subsequently, the node 110 may provide the dictator node authentication value, aPr, to the gateway node 120, as indicated in block 1122.

Figure 12:
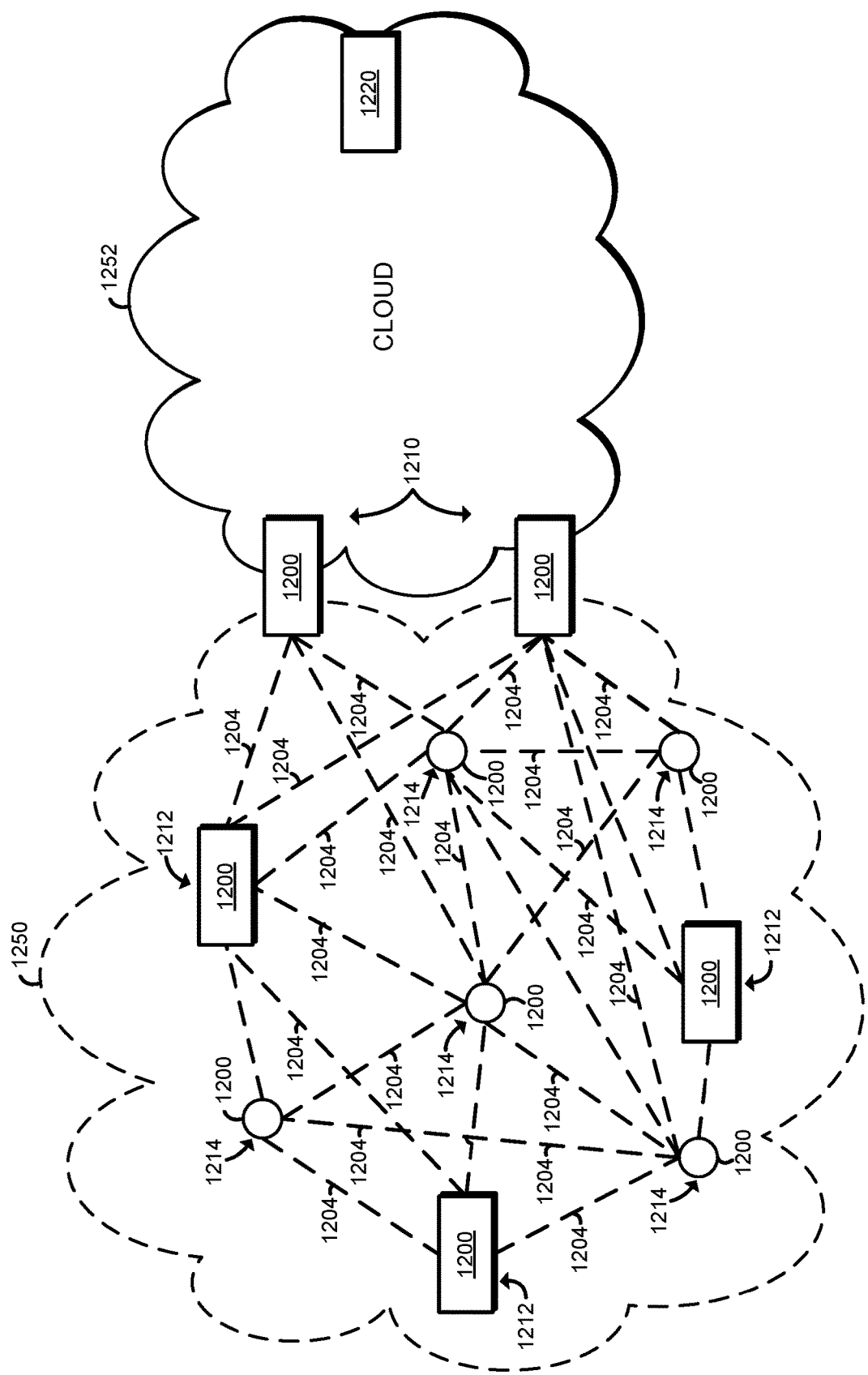
FIG. 12 is a simplified block diagram of another embodiment of the system of FIG. 1 having devices arranged in a mesh network.

Referring now to FIG. 12, in some embodiments, some or all of the nodes 110 may be embodied as Internet-of-Things devices 1200 and form, potentially with other devices, a mesh network, which may be termed as a fog 1250, operating at the edge of a cloud network 1252. The fog 1250 may be considered to be a massively interconnected network wherein a number of IoT devices 1200 are in communications with each other, for example, by radio links 1204 (all of which are not labeled in FIG. 12 to simplify the figure and for clarify). This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 1200 are shown in the example embodiment of FIG. 12, gateways 1210, data aggregators 1212, and credential providers (e.g., secret holder nodes and/or localizer nodes) 1214, although any combinations of IoT devices 1200 and functionality may be used. The gateways 1210 may be edge devices that provide communications between the cloud 1252 and the fog 1250, and may also provide the backend process function for data obtained from credential providers 1214. The data aggregators 1212 may collect data from any number of the credential providers 1214, and perform the back end processing function for the analysis. The results, raw data, or both may be passed along to the cloud 1252 through the gateways 1210. The credential providers 1214 may be full IoT devices 1900, for example, capable of both collecting data and processing the data. In some cases, the credential providers 1214 may be more limited in functionality, for example, collecting the data and allowing the data aggregators 1212 or gateways 1210 to process the data.

Communications from any IoT device 1200 may be passed along the most convenient path between any of the IoT devices 1200 to reach the gateways 1210. In these networks, the number of interconnections provide substantial redundancy, allowing communications to be maintained, even with the loss of a number of IoT devices 1200. Further, the use of a mesh network may allow IoT devices 1200 that are very low power or located at a distance from infrastructure to be used, as the range to connect to another IoT device 1200 may be much less than the range to connect to the gateways 1210.

The fog 1250 of the IoT devices 1200 devices may be presented to devices in the cloud 1252, such as a server 1220, as a single device located at the edge of the cloud 1252, e.g., a fog 1250 device. In this example, data coming from the fog 1250 device may be sent without being identified as coming from a specific IoT device 1200 within the fog 1250. For example, the data may indicate credential data for supporting an authentication process, even though the specific IoT device 1900 that provided the data may not be specifically identified.

In some examples, the IoT devices 1200 may be configured using an imperative programming style, e.g., with each IoT device 1200 having a specific function and communication partners. However, the IoT devices 1200 forming the fog 1250 device may be configured in a declarative programming style, allowing the IoT devices 1200 to reconfigure their operations and communications, such as to determine needed resources in response to conditions, queries, and device failures. As an example, an authentication request from a server 1220 may result in the fog 1250 selecting the IoT devices 1200 to provide credential data needed to answer the request. The data from devices may then be aggregated and analyzed by any combination of the credential providers 1214, data aggregators 1212, or gateways 1210, before being sent on by the fog 1250 device to the server 1220 to answer the request. Further, if some of the IoT devices 1200 are not operational, other IoT devices 1200 in the fog 1250 device may provide analogous data, if available.

EXAMPLES

Illustrative examples of the technologies disclosed herein are provided below. An embodiment of the technologies may include any one or more, and any combination of, the examples described below.

Example 1 includes a gateway node comprising a network communicator to (i) receive a request from a terminal node to authenticate a user of one or more of a plurality of heterogeneous nodes connected to the gateway node and (ii) broadcast a credential request to the plurality of nodes; and a response combiner to combine responses from the plurality of nodes to generate a combined authentication message; and wherein the network communicator is further to send the combined authentication message to the terminal node for authentication.

Example 2 includes the subject matter of Example 1, and wherein the response combiner is further to generate a validation signature as a function of the responses from the plurality of nodes; and wherein to combine the responses comprises to verify the responses as a function of the validation signature.

Example 3 includes the subject matter of any of Examples 1 and 2, and wherein the response combiner is further to receive a response from a localizer node that includes location information and a verification signature to verify the location information.

Example 4 includes the subject matter of any of Examples 1-3, and wherein to receive the request from the terminal node comprises to receive a request that includes two messages generated by the terminal node; to broadcast a credential request comprises to broadcast a credential request that includes one of the two messages; and the response combiner is further to receive a plurality of shares of a partially decrypted message generated by each of the nodes based on the message included in the credential request.

Example 5 includes the subject matter of any of Examples 1-4, and further including a key generator to generate a multi-part secret key and a public key associated with the user.

Example 6 includes the subject matter of any of Examples 1-5, and wherein the key generator is further to distribute the multi-part secret key between the plurality of nodes.

Example 7 includes the subject matter of any of Examples 1-6, and wherein to distribute the multi-part secret key between the nodes comprises to distribute shares of the multi-part secret key between secret holder nodes and at least one dictator node based on a polynomial function.

Example 8 includes the subject matter of any of Examples 1-7, and wherein to generate the secret key and the public key comprises to generate ElGamal system keys.

Example 9 includes the subject matter of any of Examples 1-8, and wherein to receive the request from the terminal node comprises to receive a set of messages based on the public key generated for the user.

Example 10 includes the subject matter of any of Examples 1-9, and further including a key generator to generate verification keys for the each of the nodes; and store the verification keys in the gateway node.

Example 11 includes the subject matter of any of Examples 1-10, and wherein to generate the verification keys comprises to generate a verification key for each of one or more secret holder nodes and at least one localizer node; and wherein the key generator is further to send the verification key for the at least one localizer node to the terminal node for storage.

Example 12 includes the subject matter of any of Examples 1-11, and wherein to combine the responses further comprises to provide a partial authentication value to a dictator node; receive, from the dictator node, a dictator node authentication value based on the partial authentication value; and determine a return value based on the dictator node authentication value, wherein to send the combined authentication message to the terminal node comprises to send the return value to the terminal node.

Example 13 includes the subject matter of any of Examples 1-12, and wherein to combine the responses comprises to determine Lagrange coefficients as a function of the responses; and determine a return value based on the Lagrange coefficients, wherein to send the combined authentication message to the terminal node comprises to send the return value to the terminal node.

Example 14 includes the subject matter of any of Examples 1-13, and wherein to receive the responses from the plurality of heterogeneous nodes comprises to receive location information from a localizer node; and to provide the combined authentication message to the terminal node comprises to send the location information to the terminal node.

Example 15 includes a method for combining data from multiple nodes in a network to authenticate a user, the method comprising receiving, by a gateway node, a request from a terminal node to authenticate a user of one or more of a plurality of nodes connected to the gateway node; broadcasting, by the gateway node, a credential request to the plurality of nodes; combining, by the gateway node, responses from the plurality of nodes to generate a combined authentication message; and sending, by the gateway node, the combined authentication message to the terminal node for authentication.

Example 16 includes the subject matter of Example 15, and further including generating, by the gateway node, a validation signature as a function of the responses from the plurality of nodes; and wherein combining the responses comprises verifying the responses as a function of the validation signature.

Example 17 includes the subject matter of any of Examples 15 and 16, and further including receiving a response from a localizer node that includes location information and a verification signature to verify the location information.

Example 18 includes the subject matter of any of Examples 15-17, and wherein receiving the request from the terminal node comprises receiving a request that includes two messages generated by the terminal node; and broadcasting a credential request comprises broadcasting a credential request that includes one of the two messages, the method further comprising receiving a plurality of shares of a partially decrypted message generated by each of the nodes based on the message included in the credential request.

Example 19 includes the subject matter of any of Examples 15-18, and further including generating a multi-part secret key and a public key associated with the user.

Example 20 includes the subject matter of any of Examples 15-19, and further including distributing the multi-part secret key between the plurality of nodes.

Example 21 includes the subject matter of any of Examples 15-20, and wherein distributing the multi-part secret key between the nodes comprises distributing shares of the multi-part secret key between secret holder nodes and at least one dictator node based on a polynomial function.

Example 22 includes the subject matter of any of Examples 15-21, and wherein generating the secret key and the public key comprises generating ElGamal system keys.

Example 23 includes the subject matter of any of Examples 15-22, and wherein receiving the request from the terminal node comprises receiving a set of messages based on the public key generated for the user.

Example 24 includes the subject matter of any of Examples 15-23, and further including generating, by the gateway node, verification keys for the each of the nodes; and storing the verification keys in the gateway node.

Example 25 includes the subject matter of any of Examples 15-24, and wherein generating the verification keys comprises generating a verification key for each of one or more secret holder nodes and at least one localizer node, the method further comprising sending, by the gateway node, the verification key for the at least one localizer node to the terminal node for storage.

Example 26 includes the subject matter of any of Examples 15-25, and wherein combining the responses further comprises providing, by the gateway node, a partial authentication value to a dictator node; receiving, by the gateway node and from the dictator node, a dictator node authentication value based on the partial authentication value; and determining, by the gateway node, a return value based on the dictator node authentication value, wherein sending the combined authentication message to the terminal node comprises sending the return value to the terminal node.

Example 27 includes the subject matter of any of Examples 15-26, and wherein combining the responses comprises determining Lagrange coefficients as a function of the responses; and determining a return value based on the Lagrange coefficients, wherein sending the combined authentication message to the terminal node comprises sending the return value to the terminal node.

Example 28 includes the subject matter of any of Examples 15-27, and wherein receiving the responses from the plurality of nodes comprises receiving location information from a localizer node; and providing the combined authentication message to the terminal node comprises sending the location information to the terminal node.

Example 29 includes one or more machine-readable storage media comprising a plurality of instructions stored thereon that, when executed, cause a gateway node to perform the method of any of Examples 15-28.

Example 30 includes a gateway node comprising means for receiving a request from a terminal node to authenticate a user of one or more of a plurality of nodes connected to the gateway node; means for broadcasting a credential request to the plurality of nodes; means for combining responses from the plurality of nodes to generate a combined authentication message; and means for sending the combined authentication message to the terminal node for authentication.

Example 31 includes the subject matter of Example 30, and further including means for generating a validation signature as a function of the responses from the plurality of nodes; and wherein the means for combining the responses comprises means for verifying the responses as a function of the validation signature.

Example 32 includes the subject matter of any of Examples 30 and 31, and further including means for receiving a response from a localizer node that includes location information and a verification signature to verify the location information.

Example 33 includes the subject matter of any of Examples 30-32, and wherein the means for receiving the request from the terminal node comprises means for receiving a request that includes two messages generated by the terminal node; and the means for broadcasting a credential request comprises means for broadcasting a credential request that includes one of the two messages, the gateway node further comprising means for receiving a plurality of shares of a partially decrypted message generated by each of the nodes based on the message included in the credential request.

Example 34 includes the subject matter of any of Examples 30-33, and further including means for generating a multi-part secret key and a public key associated with the user.

Example 35 includes the subject matter of any of Examples 30-34, and further including means for distributing the multi-part secret key between the plurality of nodes.

Example 36 includes the subject matter of any of Examples 30-35, and wherein the means for distributing the multi-part secret key between the nodes comprises means for distributing shares of the multi-part secret key between secret holder nodes and at least one dictator node based on a polynomial function.

Example 37 includes the subject matter of any of Examples 30-36, and wherein the means for generating the secret key and the public key comprises means for generating ElGamal system keys.

Example 38 includes the subject matter of any of Examples 30-37, and wherein the means for receiving the request from the terminal node comprises means for receiving a set of messages based on the public key generated for the user.

Example 39 includes the subject matter of any of Examples 30-38, and further including means for generating verification keys for the each of the nodes; and means for storing the verification keys in the gateway node.

Example 40 includes the subject matter of any of Examples 30-39, and wherein the means for generating the verification keys comprises means for generating a verification key for each of one or more secret holder nodes and at least one localizer node, the gateway node further comprising means for sending the verification key for the at least one localizer node to the terminal node for storage.

Example 41 includes the subject matter of any of Examples 30-40, and wherein the means for combining the responses further comprises means for providing a partial authentication value to a dictator node; means for receiving, from the dictator node, a dictator node authentication value based on the partial authentication value; and means for determining a return value based on the dictator node authentication value, wherein the means for sending the combined authentication message to the terminal node comprises means for sending the return value to the terminal node.

Example 42 includes the subject matter of any of Examples 30-41, and wherein the means for combining the responses comprises means for determining Lagrange coefficients as a function of the responses; and means for determining a return value based on the Lagrange coefficients, wherein the means for sending the combined authentication message to the terminal node comprises means for sending the return value to the terminal node.

Example 43 includes the subject matter of any of Examples 30-42, and wherein the means for receiving the responses from the plurality of nodes comprises means for receiving location information from a localizer node; and the means for providing the combined authentication message to the terminal node comprises means for sending the location information to the terminal node.

Example 44 includes a terminal node comprising a network communicator to (i) generate an authentication request for a user, (ii) send the authentication request to a gateway node connected to the terminal node, wherein the gateway node is connected to a plurality of heterogenous nodes associated with the user, and (iii) receive an authentication message from the gateway node, wherein the authentication message is based on a combination of responses from the nodes; and a credential verifier to determine whether the authentication message is verified.

Example 45 includes the subject matter of Example 44, and wherein the credential verifier is further to provide, in response to a determination that the authentication message is verified, access to a resource to the user.

Example 46 includes the subject matter of any of Examples 44 and 45, and wherein the credential verifier is further to deny, in response to a determination that the authentication message is not verified, access to a resource to the user.

Example 47 includes the subject matter of any of Examples 44-46, and wherein to generate an authentication request comprises to generate an authentication request that includes a pair of messages based on a public key of the user.

Example 48 includes the subject matter of any of Examples 44-47, and wherein to receive an authentication message comprises to receive a return value generated by the gateway node from the combined responses of the nodes.

Example 49 includes the subject matter of any of Examples 44-48, and wherein to verify the authentication message comprises to verify the return value generated by the gateway node.

Example 50 includes the subject matter of any of Examples 44-49, and wherein to receive an authentication message comprises to receive an authentication message that includes location information from a localizer node connected to the gateway node.

Example 51 includes the subject matter of any of Examples 44-50, and wherein to verify the authentication message comprises to verify the location information.

Example 52 includes a method for authenticating a user comprising generating, by a terminal node, an authentication request for a user; sending, by the terminal node, an authentication request to a gateway node connected to the terminal node, wherein the gateway node is connected to a plurality of heterogeneous nodes associated with the user; receiving, by the terminal node, an authentication message from the gateway node, wherein the authentication message is based on a combination of responses from the nodes; and determining, by the terminal node, whether the authentication message is verified.

Example 53 includes the subject matter of Example 52, and further including providing, in response to a determination that the authentication message is verified, access to a resource to the user.

Example 54 includes the subject matter of any of Examples 52 and 53, and further including denying, in response to a determination that the authentication message is not verified, access to a resource to the user.

Example 55 includes the subject matter of any of Examples 52-54, and wherein generating an authentication request comprises generating an authentication request that includes a pair of messages based on a public key of the user.

Example 56 includes the subject matter of any of Examples 52-55, and wherein receiving an authentication message comprises receiving a return value generated by the gateway node from the combined responses of the nodes.

Example 57 includes the subject matter of any of Examples 52-56, and wherein verifying the authentication message comprises verifying the return value generated by the gateway node.

Example 58 includes the subject matter of any of Examples 52-57, and wherein receiving an authentication message comprises receiving an authentication message that includes location information from a localizer node connected to the gateway node.

Example 59 includes the subject matter of any of Examples 52-58, and wherein verifying the authentication message comprises verifying the location information.

Example 60 includes one or more machine-readable storage media comprising a plurality of instructions stored thereon that, when executed, cause a terminal node to perform the method of any of Examples 52-60.

Example 61 includes a terminal node comprising means for generating an authentication request for a user; means for sending an authentication request to a gateway node connected to the terminal node, wherein the gateway node is connected to a plurality of heterogeneous nodes associated with the user; means for receiving an authentication message from the gateway node, wherein the authentication message is based on a combination of responses from the nodes; and means for determining whether the authentication message is verified.

Example 62 includes the subject matter of Example 61, and further including means for providing, in response to a determination that the authentication message is verified, access to a resource to the user.

Example 63 includes the subject matter of any of Examples 61 and 62, and further including means for denying, in response to a determination that the authentication message is not verified, access to a resource to the user.

Example 64 includes the subject matter of any of Examples 61-63, and wherein the means for generating an authentication request comprises means for generating an authentication request that includes a pair of messages based on a public key of the user.

Example 65 includes the subject matter of any of Examples 61-64, and wherein the means for receiving an authentication message comprises means for receiving a return value generated by the gateway node from the combined responses of the nodes.

Example 66 includes the subject matter of any of Examples 61-65, and wherein the means for verifying the authentication message comprises means for verifying the return value generated by the gateway node.

Example 67 includes the subject matter of any of Examples 61-66, and wherein the means for receiving an authentication message comprises means for receiving an authentication message that includes location information from a localizer node connected to the gateway node.

Example 68 includes the subject matter of any of Examples 61-67, and wherein the means for verifying the authentication message comprises means for verifying the location information.

Example 69 includes a node comprising a network communicator to receive a credential request from a gateway node connected to the node; and a response determiner to generate a response to the credential request to be combined with a second response from at least one other node, wherein the network communicator is further to provide the response to the gateway node to be used to authenticate a user of the node.

Example 70 includes the subject matter of Example 69, and wherein the network communicator is further to receive a share of a multi-part secret key from the gateway node; and wherein to generate the response comprises to generate a portion of an authentication message as a function of the multi-part secret key.

Example 71 includes the subject matter of any of Examples 69 and 70, and wherein the response generator is further to establish a dictator node authentication value as a function of the share of the multi-part secret key received from the gateway node; and provide the dictator node authentication value to the gateway node.

Example 72 includes the subject matter of any of Examples 69-71, and wherein to establish a dictator node authentication value comprises to receive a partial authentication value from the gateway node; and generate the dictator node authentication value based on the partial authentication value.

Example 73 includes the subject matter of any of Examples 69-72, and wherein to generate the response to the credential request comprises to generate location information indicative of a location of the user and a verification signature based on the received share of the multi-part secret key to verify the location information.

Example 74 includes a method for providing a portion of a set of credentials for authenticating a user, the method comprising receiving, by a node, a credential request from a gateway node connected to the node; generating, by the node, a response to the credential request to be combined with a second response from at least one other node; and providing, by the node, the response to the gateway node to be used to authenticate a user of the node.

Example 75 includes the subject matter of Example 74, and further including receiving, by the node, a share of a multi-part secret key from the gateway node, wherein generating the response comprises generating a portion of an authentication message as a function of the multi-part secret key.

Example 76 includes the subject matter of any of Examples 74 and 75, and further including establishing, by the node, a dictator node authentication value as a function of the share of the multi-part secret key received from the gateway node; and providing, by the node, the dictator node authentication value to the gateway node.

Example 77 includes the subject matter of any of Examples 74-76, and wherein establishing a dictator node authentication value comprises receiving a partial authentication value from the gateway node; and generating the dictator node authentication value based on the partial authentication value.

Example 78 includes the subject matter of any of Examples 74-77, and wherein generating the response to the credential request comprises generating location information indicative of a location of the user and a verification signature based on the received share of the multi-part secret key to verify the location information.

Example 79 includes one or more machine-readable storage media comprising a plurality of instructions stored thereon that, when executed, cause a node to perform the method of any of Examples 74-78.

Example 80 includes a node comprising means for receiving a credential request from a gateway node connected to the node; means for generating a response to the credential request to be combined with a second response from at least one other node; and means for providing the response to the gateway node to be used to authenticate a user of the node.

Example 81 includes the subject matter of Example 80, and further including means for receiving a share of a multi-part secret key from the gateway node, wherein the means for generating the response comprises means for generating a portion of an authentication message as a function of the multi-part secret key.

Example 82 includes the subject matter of any of Examples 80 and 81, and further including means for establishing a dictator node authentication value as a function of the share of the multi-part secret key received from the gateway node; and means for providing the dictator node authentication value to the gateway node.

Example 83 includes the subject matter of any of Examples 80-82, and wherein establishing a dictator node authentication value comprises means for receiving a partial authentication value from the gateway node; and means for generating the dictator node authentication value based on the partial authentication value.

Example 84 includes the subject matter of any of Examples 80-83, and wherein the means for generating the response to the credential request comprises means for generating location information indicative of a location of the user and a verification signature based on the received share of the multi-part secret key to verify the location information.

The invention claimed is:

1. A gateway node comprising:
   network communicator circuitry to:
      send a first secret key portion of a multi-part secret key to a first secret holder node; and
      send first and second secret shares to corresponding ones of second and third secret holder nodes;
   memory;
   instructions; and
   processor circuitry to execute the instructions to:
      generate the first secret share based on a second secret key portion of the multi-part secret key and based on existence of the second secret holder node;
      generate the second secret share based on the second secret key portion of the multi-part secret key and based on existence of the third secret holder node, the first secret share different from the second secret share;
      receive a plurality of partly decrypted authentication messages generated by fourth secret holder nodes; and
      combine the partly decrypted authentication messages and responses from the first secret holder node and at least one of the second secret holder node or the third secret holder node to generate a combined authentication message, the network communicator circuitry to send the combined authentication message to a terminal node for authentication.

2. The gateway node of claim 1, wherein ones of the responses are based on the first secret holder node and the at least one of the second secret holder node or the third secret holder node applying functions to respective ones of the first secret key portion and the second secret key portion of the multi-part secret key.

3. The gateway node of claim 1, wherein the processor circuitry is to:
   generate a validation signature based on the responses from the first secret holder node and the at least the one of the second secret holder node or the third secret holder node; and
   verify the responses based on the validation signature.

4. The gateway node of claim 1, wherein the processor circuitry is to access a second response from a localizer node, the second response including location information and a verification signature, the verification signature to verify the location information.

5. The gateway node of claim 4, wherein the processor circuitry is to access location information in the second response from the localizer node, and the network communicator circuitry is to send the location information to the terminal node.

6. The gateway node of claim 4, further including key generator circuitry to generate verification keys for ones of the first secret holder node, the localizer node, and the at least one of the second secret holder node or the third secret holder node, the memory to store the verification keys.

7. The gateway node of claim 6, wherein the key generator circuitry is to send a corresponding one of the verification keys for the localizer node to the terminal node.

8. The gateway node of claim 1, wherein the processor circuitry is to combine the responses by:
   providing a partial authentication value to the first secret holder node;
   accessing a first secret holder node authentication value from the first secret holder node based on the partial authentication value; and
   determining a return value based on the first secret holder node authentication value, the network communicator circuitry to send the return value to the terminal node.

9. The gateway node of claim 1, wherein the processor circuitry is to combine the responses by:
   determining Lagrange coefficients as a function of the responses; and
   determining a return value based on the Lagrange coefficients, the network communicator circuitry to send the return value to the terminal node.

10. The gateway node of claim 1, wherein the first secret key portion of the multi-part secret key and the second secret key portion of the multi-part secret key are the same.

11. One or more machine-readable storage media comprising instructions to cause a gateway node to at least:
   send a first secret key portion of a multi-part secret key to a first secret holder node;
   generate a first secret share based on a second secret key portion of the multi-part secret key and based on existence of a second secret holder node;
   generate a second secret share based on the second secret key portion of the multi-part secret key and based on existence of a third secret holder node, the first secret share different from the second secret share;
   send the first and second secret shares to corresponding ones of the second and third secret holder nodes;
   receive a plurality of partly decrypted authentication messages generated by fourth secret holder nodes;
   combine the partly decrypted authentication messages and responses from the first secret holder node and at least one of the second secret holder node or the third secret holder node to generate a combined authentication message; and
   send the combined authentication message to a terminal node for authentication.

12. The one or more machine-readable storage media of claim 11, wherein ones of the responses are based on the first secret holder node and the at least one of the second secret holder node or the third secret holder node applying functions to respective ones of the first secret key portion and the second secret key portion of the multi-part secret key.

13. The one or more machine-readable storage media of claim 11, wherein the instructions are to cause the gateway node to:
generate a validation signature based on the responses from the first secret holder node and the at least the one of the second secret holder node or the third secret holder node; and
verify the responses based on the validation signature.

14. The one or more machine-readable storage media of claim 11, wherein the instructions are to cause the gateway node to at least generate the multi-part secret key and a public key associated with a user.

15. The one or more machine-readable storage media of claim 14, wherein the instructions are to cause the gateway node to send the first secret key portion of the multi-part secret key to the first secret holder node and send the first and second secret shares to the corresponding ones of the second and third secret holder nodes based on a polynomial function.

16. The one or more machine-readable storage media of claim 14, wherein the instructions are to cause the gateway node to at least generate the multi-part secret key and the public key by generating ElGamal system keys.

17. The one or more machine-readable storage media of claim 11, wherein the instructions are to cause the gateway node to combine the responses by:
providing a partial authentication value to the first secret holder node;
accessing a first secret holder node authentication value from the first secret holder node based on the partial authentication value; and
determining a return value based on the first secret holder node authentication value.

18. The one or more machine-readable storage media of claim 11, wherein the instructions are to cause the gateway node to combine the responses by:
determining Lagrange coefficients as a function of the responses; and
determining a return value based on the Lagrange coefficients.

19. The one or more machine-readable storage media of claim 11, wherein the first secret key portion of the multi-part secret key and the second secret key portion of the multi-part secret key are the same.

20. A method of a gateway node, the method comprising:
sending a first secret key portion of a multi-part secret key to a first secret holder node;
generating a first secret share based on a second secret key portion of the multi-part secret key and based on existence of a second secret holder node;
generating a second secret share based on the second secret key portion of the multi-part secret key and based on existence of a third secret holder node, the first secret share different from the second secret share;
sending the first and second secret shares to corresponding ones of the second and third secret holder nodes;
receiving a plurality of partly decrypted authentication messages generated by fourth secret holder nodes;
combining the partly decrypted authentication messages and responses from the first secret holder node and at least one of the second secret holder node or the third secret holder node to generate a combined authentication message; and
sending the combined authentication message to a terminal node for authentication.

21. The method of claim 20, further including:
generating a validation signature based on the responses from the first secret holder node and the at least the one of the second secret holder node or the third secret holder node; and
verifying the responses based on the validation signature.

22. The gateway node of claim 1, wherein a first one of the responses from the first secret holder node includes a first partly decrypted authentication message, the first partly decrypted authentication message generated by the first secret holder node based on the first secret key portion of the multi-part secret key, a second one of the responses from the at least one of the second secret holder node or the third secret holder node includes a second partly decrypted authentication message, the second partly decrypted authentication message generated by the at least one of the second secret holder node or the third secret holder node based on a corresponding one of the first secret share or the second secret share.

* * * * *